United States Patent [19]
Yoshida

[11] Patent Number: 5,438,533
[45] Date of Patent: Aug. 1, 1995

[54] MULTIVALUED MULTIPLIER FOR BINARY AND MULTIVALUED LOGIC DATA

[75] Inventor: Yukihiro Yoshida, Ikoma, Japan

[73] Assignee: Sharp Kabushiki Kaisha, Osaka, Japan

[21] Appl. No.: 120,048

[22] Filed: Sep. 13, 1993

[30] Foreign Application Priority Data

Oct. 28, 1992 [JP] Japan .................................. 4-290134

[51] Int. Cl.[6] ........................... G06F 7/00; G06F 7/52
[52] U.S. Cl. .................................. 364/746.2; 364/754
[58] Field of Search .................... 364/754, 746.2, 757

[56] References Cited

U.S. PATENT DOCUMENTS

| | | | |
|---|---|---|---|
| 4,914,614 | 4/1990 | Yamakawa | 364/746.2 |
| 5,227,993 | 7/1993 | Yamakawa | 364/746.2 |
| 5,289,399 | 2/1994 | Yoshida | 364/746.2 |
| 5,299,145 | 3/1994 | Yoshida | 364/746.2 |

*Primary Examiner*—Tan V. Mai

[57] ABSTRACT

A multivalued multiplier is arranged to treat a plurality of multivalued signals at one time without having to increase the circuit scale. The multivalued multiplier includes a logic circuit and a multivalued circuit connected to the logic circuit. The logic circuit serves to receive two or more signals and output a predetermined logic result. The multivalued circuit serves to process the predetermined logic result and output a predetermined multivalued signal.

12 Claims, 21 Drawing Sheets

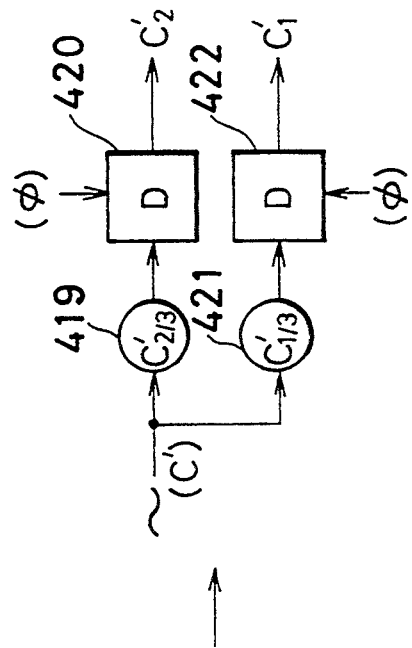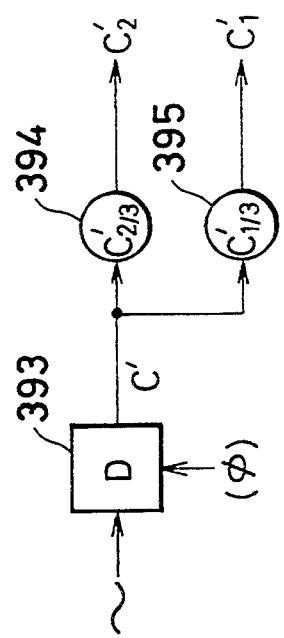

Fig. 19

|  | $X_0$ | $X_{1/3}$ | $X_{2/3}$ | $X_1$ |
|---|---|---|---|---|
| $C_0$ |  | 1 |  | 1 |
| $C_{1/3}$ | 1 | 2 | 1 | 2 |
| $C_{2/3}$ | 2 | 3 | 2 | 3 |

|  | $X_0$ | $X_{1/3}$ | $X_{2/3}$ | $X_1$ |
|---|---|---|---|---|
| $C_0$ |  |  | 1 | 2 |
| $C_{1/3}$ |  |  | 1 | 2 |
| $C_{2/3}$ |  |  | 1 | 2 |

\<C'\>

QUATERNARY OR CIRCUIT

Fig. 24

|       | $x_0X_0$ | $X_{1/2}$ | $X_1$ | $x_1X_0$ |
|-------|----------|-----------|-------|----------|
| $C_0$     |          | 1         |       | 1        |
| $C_{1/2}$ | 1        | 2         | 1     | 2        |
| $C_1$     | 2        | 3         | 2     | 3        |

|       | $x_0X_0$ | $X_{1/2}$ | $X_1$ | $x_1X_0$ |
|-------|----------|-----------|-------|----------|
| $C_0$     |          |           | 1     | 2        |
| $C_{1/2}$ |          |           | 1     | 2        |
| $C_1$     |          |           | 1     | 2        |

$< C' >$

MULTIVALUED MULTIPLIER FOR BINARY AND MULTIVALUED LOGIC DATA

BACKGROUND OF THE INVENTION

1. Field of the Invention

The present invention relates to a multivalued multiplier which may apply to information processing such as image processing, signal processing in communication, working of fonts for a laser printer, or a microprocessor.

2. Description of the Related Art

In general, the multiplier is a kind of arithmetic and logic operating unit included in a computer and is a circuit dedicated to multiplication. The term "multiplication" herein generally refers to obtaining a partial product of a multiplicand and a part of a multiplier factor (one or more bits) and adding the obtained products.

Recent computers include a built-in multiplying operation as a standard function. Several kinds of methods are applied to the computer for improving the operating performance. Of the methods for enhancing the operating speed of the multiplication, the Booth's method or the Wallis' tree method are well known. The former is arranged to reduce the number of partial products and generating units and simplify each unit, and the latter is arranged to execute additions of partial products in parallel and reduce the adding time.

As another method applying to a very large scaled integration (VLSI), a method has been proposed for arranging basic circuits in a two-dimensional array. A multiplier arranged this method is, in general, well known as an array multiplier.

However, the foregoing multiplying methods for treating only binary signals enable to theoretically yield time allowance but disable to stably execute multiplications at a high speed. This is a disadvantage.

Further, the foregoing serial type or parallel type multiplying method is unable to treat both of a binary signal and a quaternary signal, and is unable to execute multiplications at a high speed. This is also a disadvantage.

In known binary electronics, as the amount of information to be processed is surprisingly increased, the electronic devices and the operating units configuring the hardware are required to be faster and have higher function. The binary electronics technique has a certain limitation in the field of information processing. Moreover, in binary electronics, as the amount of data to be processed becomes larger, it is more difficult to implement the rapid and highly functional electronic devices and operating units.

SUMMARY OF THE INVENTION

It is an object of the present invention to provide a multivalued multiplier which is capable of making a bit signal multivalued, and treating two or more multivalued signals without increasing circuit scale.

The object of the present invention can be achieved by a multivalued multiplier for making a bit signal multivalued and treating two or more multivalued signals without increasing circuit scale which includes a unit for generating a plurality of multivalued signals, a logic circuit unit connected to the generating unit for receiving the plurality of multivalued signals from the generating unit and for outputting a plurality of logical results by using logical instructions thereof in accordance with the plurality of multivalued signals received from the generating unit, and a multivalued circuit unit connected to the logic circuit unit for receiving the plurality of logical results from the logic circuit unit and for outputting predetermined multivalued signals in accordance with the logic result received from the logic circuit unit.

The multivalued multiplier further comprises another logic circuit unit connected to the multivalued circuit unit for receiving the predetermined multivalued signals output from the multivalued circuit unit and for outputting multiplied signals with predetermined multivalues.

Preferably, the generating unit is adapted to generate the multivalued signals in accordance with specific multivalued signals received from external devices.

More preferably, the multivalued circuit unit is adapted to receive the multivalued signals output from the logic circuit unit and to output signals of the predetermined multivalues.

The multivalued circuit unit includes a plurality of multivalued functional elements, each of the multivalued functional elements being adapted to receive one of the multivalued signals output from the logic circuit unit and to output a signal having a threshold value of the predetermined multivalues.

The plurality of multivalued functional elements include a first kind of multivalued functional elements which are adapted to receive both a specific-valued signal and one of the multivalued signals output from the logic circuit unit.

The multivalued circuit unit is arranged to execute a logical sum operation of the predetermined multivalues using the plurality of multivalued functional elements.

The object of the present invention also can be achieved by a multivalued multiplier for making a bit signal multivalued and treating two or more multivalued signals without increasing circuit scale which includes a unit for generating a plurality of multivalued signals, a multivalued circuit unit connected to the generating unit for receiving the plurality of multivalued signals output from the generating unit and for outputting predetermined multivalued signals, and a logic circuit unit connected to the multivalued circuit unit for receiving the predetermined multivalued signals output from the multivalued circuit unit and for outputting multiplied signals with predetermined multivalues.

Preferably, the multivalued multiplier further comprises another logic circuit unit connected to both of the generating unit and the multivalued circuit unit for receiving the multivalued signals output from the generating unit and for outputting a plurality of logical results to specific numbers of the plurality of multivalued functional elements in the multivalued circuit unit by using logical instructions thereof.

In the arrangement and the function, if the amount of signal to be processed at one time is increased, the multiplying speed is made faster and the number of substantially used circuit elements is made lower without having to increase the circuit scale of the multiplier. This lowers the power consumption. The reduction of signals to be treated in number results in reducing wires on an LSI. This makes it possible to implement more highly integration and treat multivalued signals such as a binary signal, a ternary signal, and a quaternary signal at one time.

Further objects and advantages of the present invention will be apparent from the following description of the preferred embodiments of the invention as illustrated in the accompanying drawings.

BRIEF DESCRIPTION OF THE DRAWINGS

FIG. 14 composed of FIGS. 14a and 14b is a circuit diagram showing an arrangement of a replacing circuit included in the quaternary multiplier shown in FIG. 10;

FIG. 19 is a chart showing a logic of squares executed in a squaring circuit according to a fourth embodiment of the present invention;

FIG. 20 is a chart showing a logic of carries $<C'>$ in the squaring circuit;

FIG. 24 is a chart showing a logic of squares $<Z'$, $Z>$ used in a ternary squaring circuit according to a fifth embodiment of the present invention;

FIG. 25 is a chart showing a logic of carries $<C'>$ used in the ternary squaring circuit.

DESCRIPTION OF THE PREFERRED EMBODIMENTS

Referring to the accompanying drawings, a preferred embodiment of a multivalued multiplier according to the present invention will be described in detail.

Figure 1A:
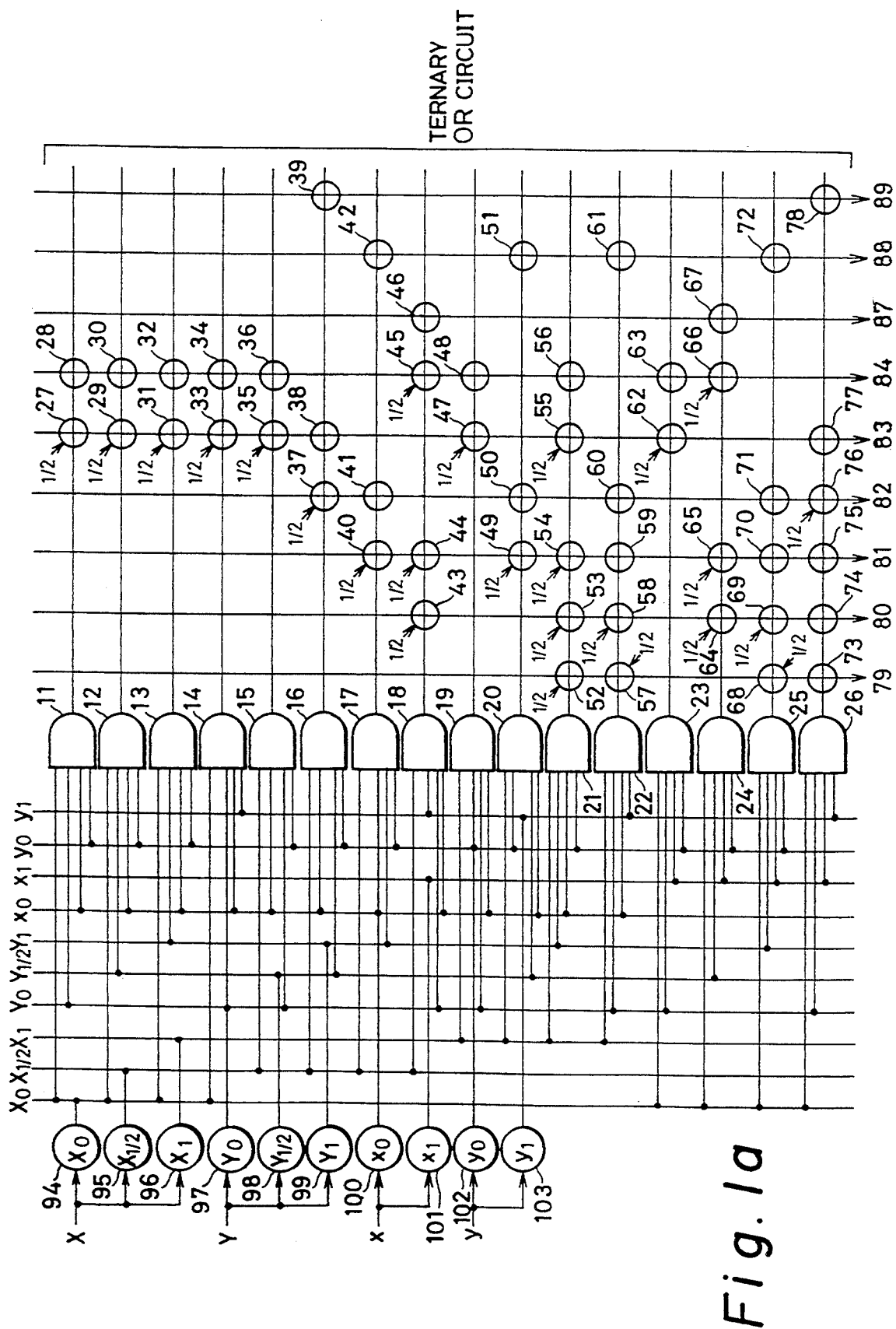
FIG. 1 composed of FIGS. 1a and 1b is a circuit diagram showing an arrangement of a ternary multiplier according to a first embodiment of the present invention.
Figure 1B:
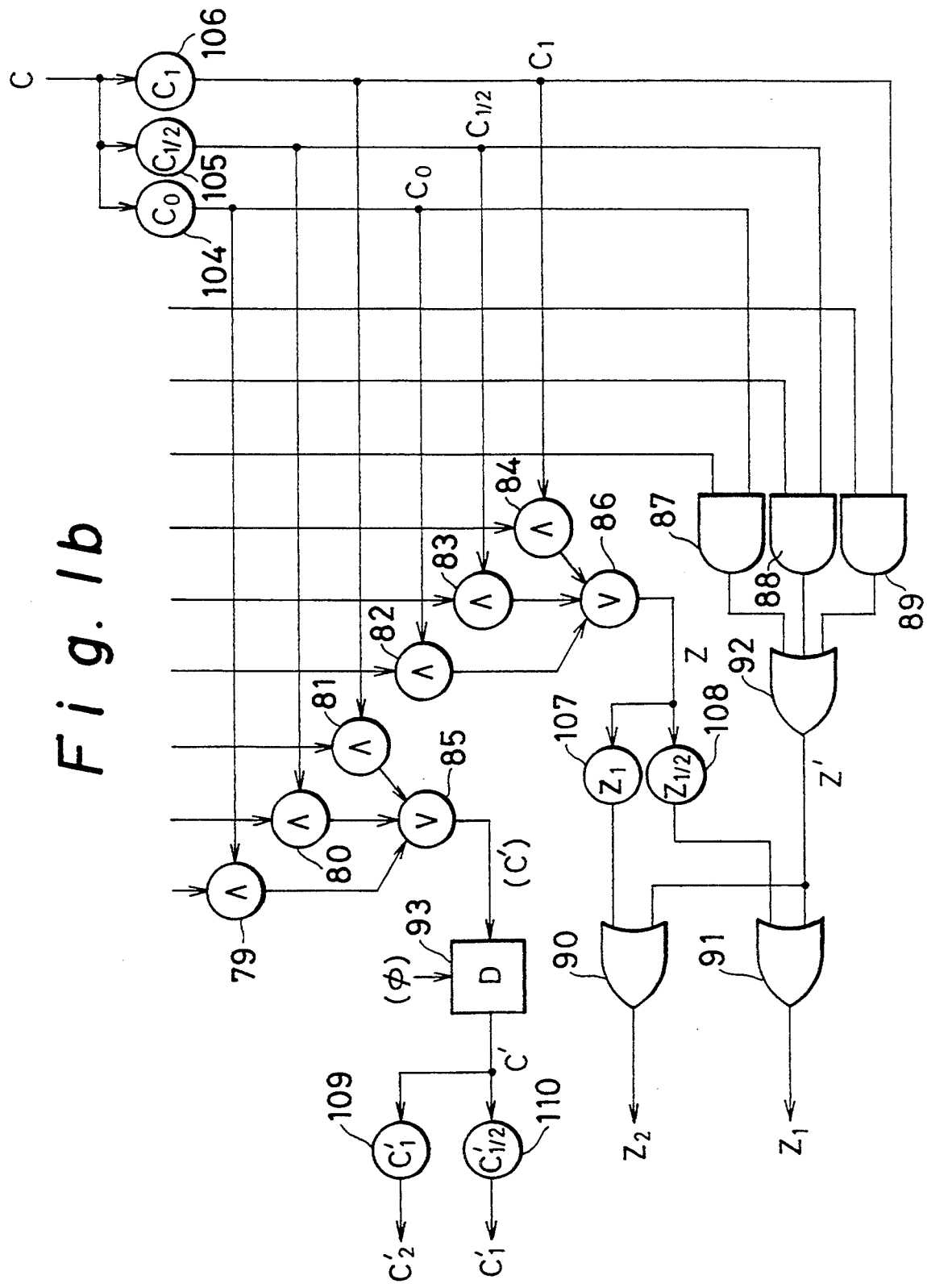

FIG. 1 composed of FIGS. 1a and 1b shows an arrangement of a ternary multiplier according to the first embodiment of the present invention.

The ternary multiplier shown in FIG. 1 is arranged to have AND circuit elements (AND elements) 11 to 26, multivalued functional elements 27 to 78, AND elements 79 to 84, OR circuit elements (OR elements) 85, 86, AND elements 87 to 89, OR elements 90 to 92, a one-bit delay circuit 93, and I/O elements 94 to 110.

Next, each of those components will be described.

The I/O element 94 receives a ternary signal X and feeds a binary signal $X_0$. The I/O element 95 receives the ternary signal X and feeds a binary signal $X_{\frac{1}{2}}$. The I/O element 96 receives the ternary signal X and feeds a binary signal $X_1$.

The I/O element 97 receives a ternary signal Y and feeds a binary signal $Y_0$. The I/O element 98 receives the ternary signal Y and feeds a binary signal $Y_{\frac{1}{2}}$. The I/O element 99 receives the ternary signal Y and feeds a binary signal $Y_1$.

The I/O element 100 receives a binary signal x and feeds a binary signal $x_0$. The I/O element 101 receives the binary signal x and feeds the binary signal $x_1$.

The I/O element 102 receives a binary signal y and feeds a binary signal $y_0$. The I/O element 103 receives the binary signal y and feeds a binary signal $y_1$.

The AND element 11 receives binary signals $X_0$, $Y_0$, $x_0$ and $y_0$ and feeds a logical product (AND) of those binary signals. The other AND elements perform the same operation with respect to the shifted combination of the binary signals. That is, the AND element 12 receives binary signals $X_0$, $Y_{\frac{1}{2}}$, $x_0$ and $y_0$ and feeds a logical product of those binary signals. The AND element 13 receives binary signals $X_0$, $Y_1$, $x_0$ and $y_0$ and feeds a logical product of those binary signals. The AND element 14 receives binary signals $X_0$, $Y_0$, $x_0$ and $y_1$ and feeds a logical product of those binary signals.

The AND element 15 receives binary signals $X_{\frac{1}{2}}$, $Y_0$, $x_0$ and $y_0$ and feeds a logical product of those binary signals. The AND element 16 receives binary signals $X_{\frac{1}{2}}$, $Y_{\frac{1}{2}}$, $x_0$ and $y_0$ and feeds a logical product of those binary signals. The AND element 17 receives binary signals $X_{\frac{1}{2}}$, $Y_1$, $x_0$ and $y_0$ and feeds a logical product of those binary signals. The AND element 18 receives binary signals $X_{\frac{1}{2}}$, $Y_0$, $x_0$ and $y_1$ and feeds a logical product of those binary signals. The AND element 19 receives binary signals $X_1$, $Y_0$, $x_0$ and $y_0$ and feeds a logical product of those binary signals. The AND element 20 receives binary signals $X_1$, $Y_{\frac{1}{2}}$, $x_0$ and $y_0$ and feeds a logical product of those binary signals. The AND element 21 receives binary signals $X_1$, $Y_1$, $x_0$ and $y_0$ and feeds a logical product of those binary signals. The AND element 22 receives binary signals $X_1$, $Y_0$, $x_0$ and $y_1$ and feeds a logical product of those binary signals. The AND element 23 receives binary signals $X_0$, $Y_0$, $x_1$ and $y_0$ and feeds a logical product of those binary signals. The AND element 24 receives binary signals $X_0$, $Y_{\frac{1}{2}}$, $x_1$ and $y_0$ and feeds a logical product of those binary signals. The AND element 25 receives binary signals $X_0$, $Y_1$, $x_1$ and $y_0$ and feeds a logical product of those binary signals. The AND element 26 receives binary signals $X_0$, $Y_0$, $x_1$ and $y_1$ and feeds a logical product of those binary signals.

The multivalued functional element 27 receives an output from the AND element 11 and feeds a ternary threshold value. The multivalued functional element 28 receives an output from the AND element 11 and feeds a binary threshold value.

Likewise, the combination of the multivalued functional elements perform similar operations with respect to the output from the corresponding AND elements. The later description will be oriented to the concrete operation of each combination of the multivalued functional elements.

The multivalued functional element 29 receives an output from the AND element 12 and feeds a ternary threshold value. The multivalued functional element 80 receives an output from the AND element 12 and feeds a binary threshold value.

The multivalued functional element 81 receives an output from the AND element 18 and feeds a ternary threshold value. The multivalued functional element 82 receives an output from the AND element 18 and feeds a binary threshold value.

The multivalued functional element 88 receives an output from the AND element 14 and feeds a ternary threshold value. The multivalued functional element 84 receives an output from the AND element 14 and feeds a binary threshold value.

The multivalued functional element 85 receives an output from the AND element 15 and feeds a ternary threshold value. The multivalued functional element 88 receives an output from the AND element 15 and feeds a binary threshold value.

The multivalued functional element 87 receives an output from the AND element 16 and feeds a ternary threshold value. The multivalued functional element 38 receives an output from the AND element 16 and feeds a binary threshold value. The multivalued functional element 89 receives an output from the AND element 16 and feeds a binary threshold value.

The multivalued functional element 40 receives an output from the AND element 17 and feeds a ternary threshold value. The multivalued functional element 41 receives an output from the AND element 17 and feeds a binary threshold value. The multivalued functional element 42 receives an output from the AND element 17 and feeds a binary threshold value.

The multivalued functional element 43 receives an output from the AND element 18 and feeds a ternary threshold value. The multivalued functional element 44 receives an output from the AND element 18 and feeds a ternary threshold value. The multivalued functional element 45 receives an output from the AND element 18 and feeds a ternary threshold value. The multivalued functional element 46 receives an output from the AND element 18 and feeds a binary threshold value The multivalued functional element 47 receives an output from the AND element 19 and feeds a ternary threshold value. The multivalued functional element 48 receives an output from the AND element 19 and feeds a binary threshold value.

The multivalued functional element 49 receives an output from the AND element 20 and feeds a ternary threshold value. The multivalued functional element 50 receives an output from the AND element 20 and feeds a binary threshold value. The multivalued functional element 51 receives an output from the AND element 20 and feeds a binary threshold value.

The multivalued functional element 52 receives an output from the AND element 21 and feeds a ternary threshold value. The multivalued functional element 53 receives an output from the AND element 21 and feeds a ternary threshold value. The multivalued functional element 54 receives an output from the AND element 21 and feeds a ternary threshold value. The multivalued functional element 55 receives an output from the AND element 21 and feeds a ternary threshold value. The multivalued functional element 56 receives an output from the AND element 21 and feeds a binary threshold value.

The multivalued functional element 57 receives an output from the AND element 22 and feeds a ternary threshold value. The multivalued functional element 58 receives an output from the AND element 22 and feeds a ternary threshold value. The multivalued functional element 59 receives an output from the AND element 22 and feeds a binary threshold value. The multivalued functional element 60 receives an output from the AND element 22 and feeds a binary threshold value. The multivalued functional element 61 receives an output from the AND element 22 and feeds a binary threshold value.

The multivalued functional element 62 receives an output from the AND element 23 and feeds a ternary threshold value. The multivalued functional element 63 receives an output from the AND element 23 and feeds a binary threshold value.

The multivalued functional element 64 receives an output from the AND element 24 and feeds a ternary threshold value. The multivalued functional element 65 receives an output from the AND element 24 and feeds a ternary threshold value. The multivalued functional element 66 receives an output from the AND element 24 and feeds a ternary threshold value. The multivalued functional element 67 receives an output from the AND element 24 and feeds a binary threshold value.

The multivalued functional element 68 receives an output from the AND element 25 and feeds a ternary threshold value. The multivalued functional element 69 receives an output from the AND element 25 and feeds a ternary threshold value. The multivalued functional element 70 receives an output from the AND element 25 and feeds a binary threshold value. The multivalued functional element 71 receives an output from the AND element 25 and feeds a binary threshold value. The multivalued functional element 72 receives an output from the AND element 25 and feeds a binary threshold value.

The multivalued functional element 73 receives an output from the AND element 26 and feeds a binary threshold value. The multivalued functional element 74 receives an output from the AND element 26 and feeds a binary threshold value. The multivalued functional element 75 receives an output from the AND element 26 and feeds a binary threshold value. The multivalued functional element 76 receives an output from the AND element 26 and feeds a ternary threshold value. The multivalued functional element 77 receives an output from the AND element 26 and feeds a binary threshold value. The multivalued functional element 78 receives an output from the AND element 26 and feeds a binary threshold value.

The I/O element 104 receives a ternary carry input C and feeds a carry signal $C_0$. The I/O element 105 receives a ternary carry input C and feeds a carry signal $C_{\frac{1}{2}}$. The I/O element 106 receives a ternary carry input C and feeds a carry signal $C_1$.

The AND element 79 receives any one of the outputs from the multivalued functional elements 52, 57, 68 and 73 and the carry signal $C_0$ from the I/O element 104 and feeds a logical product (AND) of these two signals.

The AND element 80 receives any one of the outputs from the multivalued functional elements 43, 53, 58, 64, 69 and 74 and the carry signal $C_{\frac{1}{2}}$ from the I/O element 105 and feeds a logical product (AND) of these two signals.

The AND element 81 receives any one of the outputs from the multivalued functional elements 40, 44, 49, 54, 59, 65, 70 and 75 and the carry signal $C_1$ from the I/O element 106 and feeds a logical product (AND) of these two signals.

The OR element 85 receives the outputs from the AND elements 79, 80 and 81 and feeds a carry signal (C') corresponding to a logical sum (OR) of these signals. The one-bit delay circuit 93 receives the carry signal (C') sent from the OR element 85 and feeds another carry signal C' which is delayed by one-bit.

The I/O element 109 receives the carry signal C' sent from the one-bit delay circuit 93 and feeds a carry signal $C'_2$. The I/O element 110 also receives the carry signal C' sent from the one-bit delay circuit 93 and feeds a carry output $C'_1$.

The AND element 82 receives any one of the outputs from the multivalued functional-elements 37, 41, 50, 60, 71 and 76 and the carry signal $C_0$ from the I/O element 104 and feeds a logical product (AND) of the two signals. The AND element 83 receives any one of the outputs from the multivalued functional elements 27, 29, 31, 33, 35, 38, 47, 55, 62 and 77 and the carry signal $C_{\frac{1}{2}}$ sent from the I/O element 105 and Feeds a logical product of the two signals. The AND element 84 receives any one of the outputs from the multivalued functional elements 28, 30, 32, 34, 36, 45, 48, 56, 63 and 66 and the carry signal $C_1$ sent From the I/O element 106 and Feeds a logical product (AND) of the two signals. Then, the OR element 86 receives the outputs From the AND elements 82, 83 and 84 and Feeds a multiplied output Z corresponding to the logical product of the outputs.

The I/O element 107 receives the multiplied output Z and feeds a new multiplied output $Z_1$ to the OR element 90. The I/O element 108 receives the multiplied output Z and feeds a new multiplied output $Z_{\frac{1}{2}}$ to the OR element 91.

The AND element 87 receives any one of the outputs from the multivalued functional elements 46 and 47 and the carry signal $C_0$ sent from the I/O element 104 and feeds a logical product of the two signals. The AND element 88 receives any one of the outputs from the multivalued functional elements 42, 51, 61 and 72 and the carry signal $C_{\frac{1}{2}}$ sent from the I/O element 105 and feeds a logical product of the two signals.

The AND element 89 receives any one of the outputs from the multivalued functional elements 39 and 78 and the carry signal $C_1$ sent from the I/O element 106 and feeds a logical product of the two signals.

The OR element 92 receives the outputs from the AND elements 87, 88 and 89 and feeds a multiplied output Z' corresponding to a logical sum (OR) of these outputs to the OR elements 90 and 91. The OR element 90 feeds a multiplied output $Z_2$ corresponding to a logical sum (OR) of the output from the I/O element 107 and the multiplied output Z' from the OR element 92. The OR element 91 feeds a multiplied output $Z_1$ corresponding to a logical sum of the output from the I/O element 108 and the multiplied output Z' from the OR element 92.

The multivalued functional element may be a quantizing functional element. The quantizing functional element uses as an operating principle the wave theory of electrons and the quantum-mechanical quality that electrons hold energy merely at scattered spots. This element has a multivalued logic characteristic and is often referred to as a micro-structural element, a quantum-level element, or a quantum-wave element.

Figure 2:
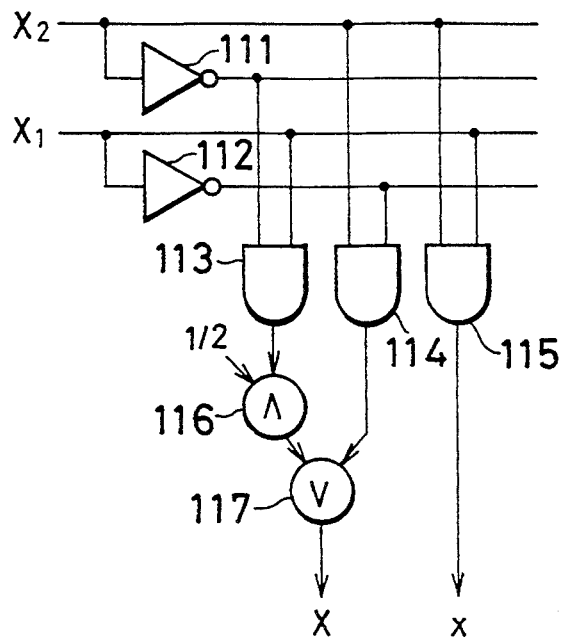
FIG. 2 is a circuit diagram showing an arrangement of a binary I/O circuit with three values which may apply to the ternary multiplier shown in FIG. 1.

The inputs X and x shown in FIG. 1a are obtained from a binary input circuit shown in FIG. 2. The binary input circuit shown in FIG. 2 is arranged of NOT elements 111 and 112, AND elements 113 to 115, an AND element 116, and an OR element 117.

Next, the description will be oriented to an operation of the binary input circuit shown in FIG. 2.

The NOT element 111 receives a two-bit parallel binary signal $X_2$ and feeds the inverted signal. The NOT element 112 receives a two-bit parallel binary signal $X_1$ and feeds the inverted signal.

The AND element 113 receives an output from the NOT element 111 and the binary signal $X_1$ and feeds a logical product of the two signals. The AND element 116 receives an output from the AND element 113 and an input with a value of "$\frac{1}{2}$" and feeds a logical product of the two signals. The AND element 114 receives an output from the NOT element 112 and the binary signal $X_2$ and feeds a logical product of the two signals.

The OR element 117 receives an output from the AND element 116 and an output from the AND element 114 and feeds a logical sum (OR) of the two outputs, that is, a ternary signal X. The AND element 115 receives the binary signals $X_1$ and $X_2$ and feeds a logical product of the two signals, that is, a binary signal X.

Figure 3:
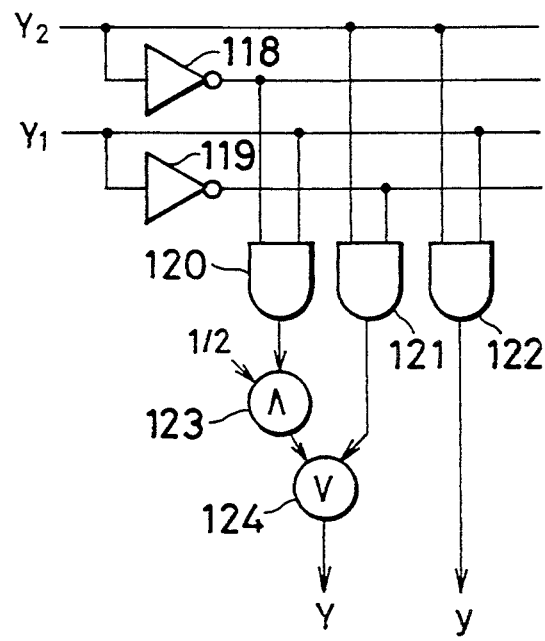
FIG. 3 is a circuit diagram showing another arrangement of a binary I/O circuit with three values which may apply to the ternary multiplier shown in FIG. 1.

The inputs Y and y shown in FIG. 1a are obtained from a binary input circuit shown in FIG. 3. The binary input circuit shown in FIG. 3 is arranged of NOT elements 118 and 119, AND elements 120 to 122, and an OR element 124.

Next, the description will be oriented to an operation of the binary input circuit shown in FIG. 3.

The NOT element 118 receives a two-bit parallel binary signal $Y_2$ and feeds the inverted signal. The NOT element 119 receives a two-bit parallel binary signal $Y_1$ and feeds the inverted signal.

The AND element 120 receives an output from the NOT element 118 and the binary signal $Y_1$ and feeds a logical product of the two signals. The AND element 123 receives an output from the AND element 120 and an input with a value of "$\frac{1}{2}$" and feeds a logical product of the two signals. The AND element 121 receives an output from the NOT element 119 and the binary signal $Y_2$ and feeds a logical product of the two signals.

The OR element 124 receives an output from the AND element 123 and an output from the AND element 121 and feeds a logical sum (OR) of the two signals, that is, a ternary output signal Y. The AND element 122 receives the binary signals $Y_1$ and $Y_2$ and feeds a logical product of the two signals, that is, a binary output signal y.

Figure 4:
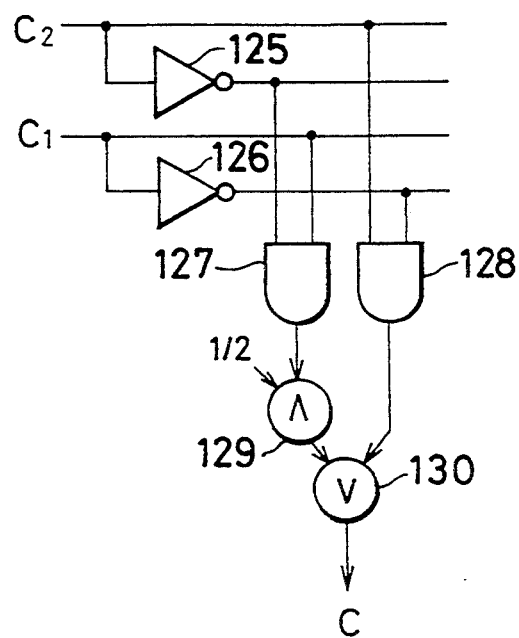
FIG. 4 is a circuit diagram showing another arrangement of a binary I/O circuit with three values which may apply to the ternary multiplier shown in FIG. 1.

Further, the input C shown in FIG. 1b is obtained from a binary input circuit shown in FIG. 4. The binary input circuit shown in FIG. 4 is arranged of NOT elements 125 and 126, AND elements 127 and 128, an AND element 129, and an OR element 130.

Next, the description will be oriented to an operation of the binary input circuit shown in FIG. 4.

The NOT element 125 receives a two-bit parallel binary signal $C_2$ and feeds an inverted signal. The NOT element 126 feeds a two-bit parallel binary signal $C_1$ and feeds an inverted signal.

The AND element 127 receives an output from the NOT element 125 and the binary signal $C_1$ and feeds a logical product of the two signals. The AND element 129 receives an output from the AND element 127 and an input with a value of "$\frac{1}{2}$" and feeds a logical product of the two signals. The AND element 128 receives an output from the NOT element 126 and the binary signal $C_2$ and feeds a logical product of the two signals. Then, the OR element 180 receives an output from the AND element 129 and an output from the AND element 128 and feeds a ternary output signal C corresponding to a logical sum (OR) of the two signals.

Table 1 lists codes allocated for two-bit parallel binary signals $X_2$, $X_1$, $Y_2$ and $Y_1$, ternary output signals X, x, Y, y, and carry signals $C_2$, $C_1$, C.

TABLE 1

| $X_2$ | $X_1$ | $Y_2$ | $Y_1$ | x | X | y | Y | $C_2$ | $C_1$ | C |
|---|---|---|---|---|---|---|---|---|---|---|
| 0 | 0 | 0 | 0 | 0 | 0 | 0 | 0 | 0 | 0 | 0 |
| 0 | 1 | 0 | 1 | 0 | $\frac{1}{2}$ | 0 | $\frac{1}{2}$ | 0 | 1 | $\frac{1}{2}$ |
| 1 | 0 | 1 | 0 | 0 | 1 | 0 | 1 | 1 | 0 | 1 |
| 1 | 1 | 1 | 1 | 1 | 0 | 1 | 0 | — | — | — |
|  |  |  |  |  | ($\frac{1}{2}$ 0) |  | ($\frac{1}{2}$ 0) |  |  |  |

The following expressions (1), (2) and (3) are logical formulas corresponding to Table 1.

$$X = \tfrac{1}{2}\overline{X}_2 X_1 + X_2 \overline{X}_1, \ x = X_2 X_1 \text{ or } (x = \tfrac{1}{2} X_2 X_1) \quad (1)$$

$$Y = \tfrac{1}{2}\overline{Y}_2 Y_1 + Y_2 \overline{Y}_1, \ y = Y_2 Y_1 \text{ or } (y = \tfrac{1}{2} Y_2 Y_1) \quad (2)$$

$$C = \tfrac{1}{2}\overline{C}_2 C_1 + C_2 \overline{C}_1 \quad (3)$$

Chart 1 lists logic built in a ternary multiplier.

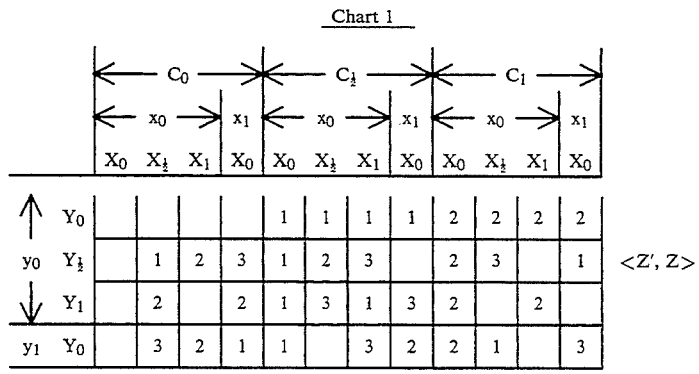

Chart 1

Chart 2 listes carry outputs from the ternary multiplier.

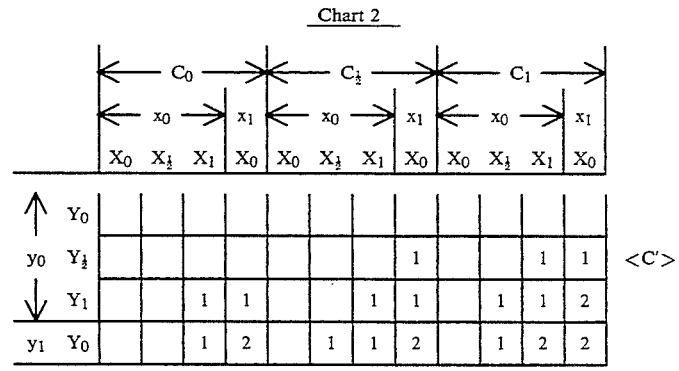

Chart 2

A symbol added to the multivalued functional element shown in FIG. 1 means a physical function as shown in Table 2. The multivalued function may be any one of several kinds of logical elements.

TABLE 2

| Symbol | Function |
|---|---|
| [square with ½ arrow into ⊕] | (1) Ternary AND Circuit<br>(2) Ternary Threshold Value ELement<br>(3) Quantizing Functional Element<br>Any one operates to output a signal with a value of "0" or "½". |
| [square with ⊕] | (1) Binary Threshold Value Element<br>(2) Quantizing Functional Element<br>Any one operates to output a signal with a value of "0" or "1". |

These logical elements may apply to the binary input circuit as shown in FIGS. 2, 3 or 4 as well as a ternary logic circuit (equivalent circuit, OR circuit, AND circuit and so forth) configuring a ternary multiplier.

Table 3 lists a ternary multiplied output $<Z', Z>$ and a binary multiplied output $<Z_2, Z_1>$ and a relation of codes assigned to the outputs.

TABLE 3

| $Z'$ | $Z$ | $Z_2$ | $Z_1$ |
|---|---|---|---|
| 0 | 0 | 0 | 0 |
| 0 | ½ | 0 | 1 |
| 0 | 1 | 1 | 0 |
| 1 | 0 | 1 | 1 |

In FIG. 1, $x_0$ and $x_1$ are indicated by the equivalent circuits. In this case, since $x_0$ and $x_1$ are binary signals, they may be an x bar and an output signal of the x. This holds true to $y_0$ and $y_1$ in FIG. 1.

As indicated in the table 1, in place of (1,0) for (x,X), (½,0) may be allocated, and in place of (1,0) for (y,Y), (½,0) may be allocated.

In this embodiment, for (½,0), the similar synthesis may be executed. Hence, the description about this case is not herein. In the chart 1, a blank portion is "0", "1" is ½, "2" is 1, and "3" is (10). Based on these values, the ternary multiplier shown in FIG. 1 is arranged.

The chart 2 indicates the carry outputs. In the table, a blank is "0", "1" is ½ and "2" is 1. Based on these values, the ternary multiplier is arranged.

Figure 5A:
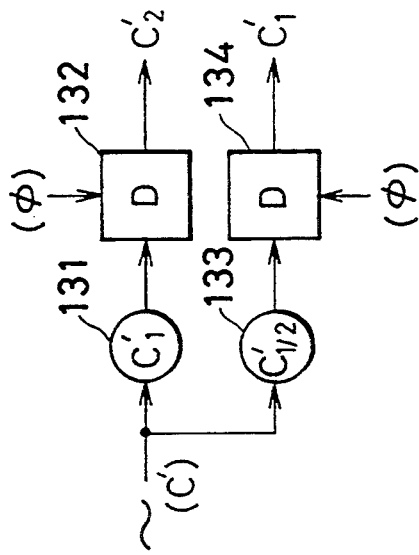
FIG. 5 composed of FIGS. 5a and 5b is a circuit diagram showing an arrangement of a replacing circuit included in the ternary multiplier shown in FIG. 1.
Figure 5B:
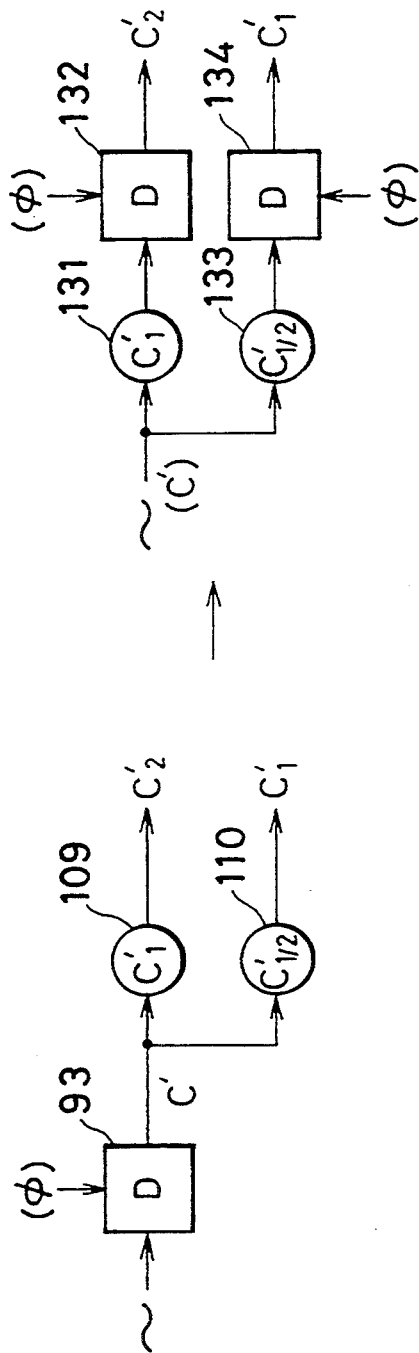

FIG. 5 composed of FIGS. 5a and 5b shows a replacing circuit (see FIG. 5a) arranged to have the one-bit delay circuit 93 and the I/O elements 109 and 110, which are indicated in the arrangement of the ternary multiplier shown in FIG. 1, and to feed the carry outputs $C_{2'}$ and $C_{1'}$, and another replacing circuit (see FIG. 5b) to be exchanged with the former replacing circuit as indicated by an arrow.

The replacing circuit shown in FIG. 5b is arranged of an I/O element 131 for inputting a carry output (C') and outputting a carry output $C_{1'}$, a delay circuit 132 connected to the I/O element 131 for receiving the carry output $C_{1'}$ sent from the I/O element 131, delaying the carry output $C_{1'}$ by one bit and feeding a carry output $C_{2'}$, an I/O element 133 for inputting the carry output (C') and outputting a carry output $C_{\frac{1}{2}'}$, and a delay circuit 134 connected to the I/O element 133 for receiving the carry output $C_{\frac{1}{2}'}$ sent from the I/O element 133, delaying the carry output $C_{\frac{1}{2}'}$ by one bit, and feeding a carry output $C_{1'}$.

Figure 6:
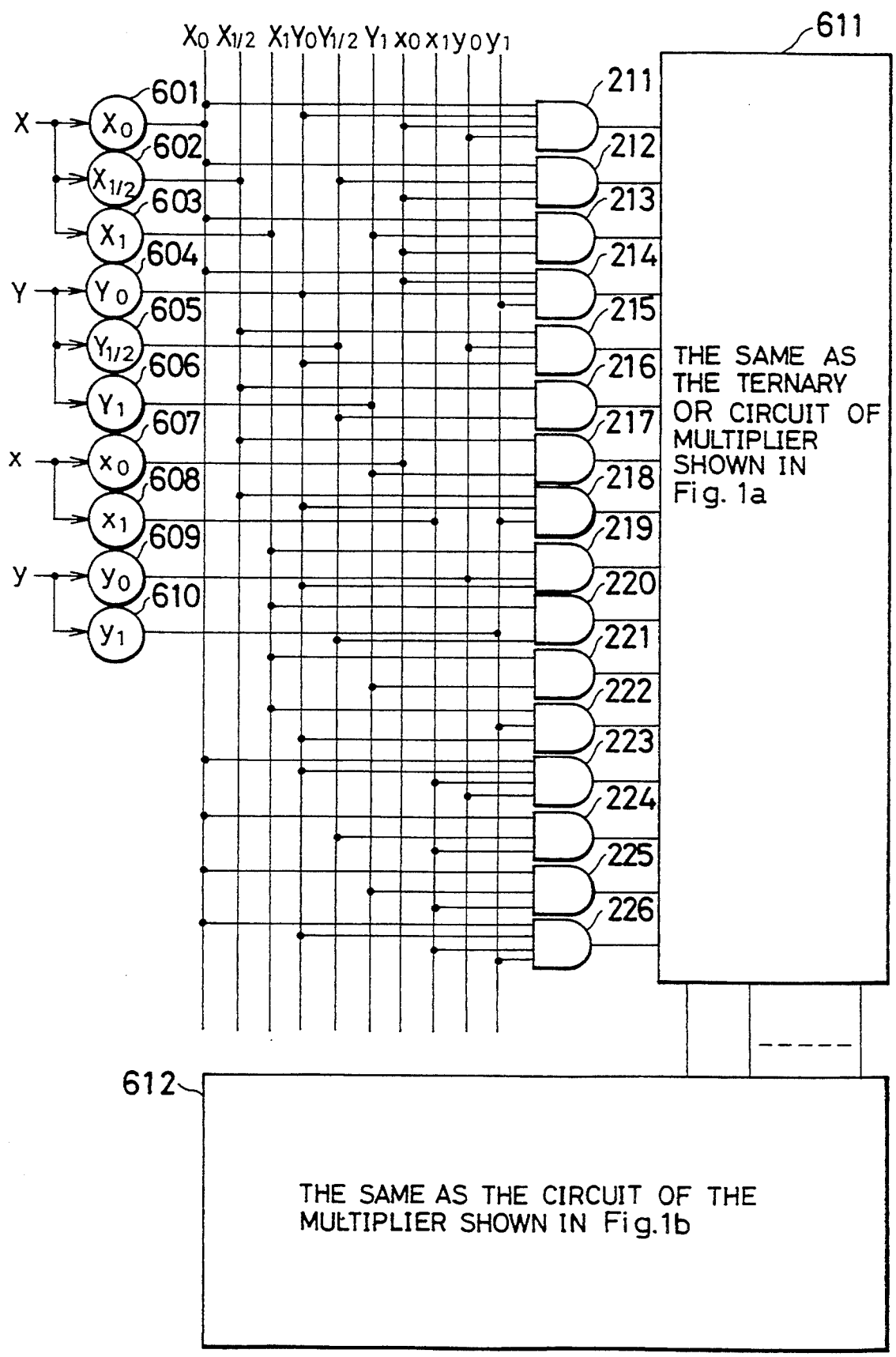
FIG. 6 is a circuit diagram showing an arrangement of a ternary multiplier according to a second embodiment of the present invention.

FIG. 6 is a block diagram showing an arrangement of a ternary multiplier according to a second embodiment of the present invention.

The ternary multiplier shown in FIG. 6 has the same essential part 601 to 612 as the ternary multiplier shown in FIG. 1, except the input arrangement of AND elements 211 to 226.

Later, the description will be oriented to the input operation of the AND elements 211 to 226 shown in FIG. 6. The other part of the arrangement shown in FIG. 6 is the same as that shown in FIG. 1 and thus is not described here.

The AND element 211 receives binary signals $X_0$, $Y_0$, $x_0$ and $y_0$ and feeds a logical product of these signals. The AND element 212 receives binary signals $X_0$, $Y_{\frac{1}{2}}$ and $x_0$ and feeds a logical product of these signals. The AND element 213 receives binary signals $X_0$, $Y_1$ and $x_0$ and feeds a logical product of these signals. The AND element 214 receives binary signals $X_0$, $Y_0$, $x_0$ and $y_1$ and feeds a logical product of these signals. The AND element 215 receives binary signals $X_{\frac{1}{2}}$, $Y_0$ and $y_0$ and feeds a logical product of these signals. The AND element 216 receives binary signals $X_{\frac{1}{2}}$ and $Y_{\frac{1}{2}}$ and feeds a logical product of these signals. The AND element 217 receives binary signals $X_{\frac{1}{2}}$ and $Y_1$ and feeds a logical product of these signals. The AND element 218 receives binary signals $X_{\frac{1}{2}}$, $Y_0$ and $y_1$ and feeds a logical product of these signals. The AND element 219 receives binary signals $X_1$, $Y_0$ and $y_0$ and feeds a logical product of these signals. The AND element 220 receives binary signals $X_1$ and $Y_{\frac{1}{2}}$ and feeds a logical product of these signals. The AND element 221 receives binary signals $X_1$ and $Y_1$ and feeds a logical product of these signals. The AND element 222 receives binary signals $X_1$, $Y_0$ and $y_1$ and feeds a logical product of these signals. The AND element 223 receives binary signals $X_0$, $Y_0$, $x_1$ and $y_0$ feeds a logical product of these signals. The AND element 224 receives binary signals $X_0$, $Y_{\frac{1}{2}}$ and $x_1$ and feeds a logical product of these signals. The AND element 225 receives binary signals $X_0$, $Y_1$ and $x_1$ and feeds a logical product of these signals. The AND element 226 receives binary signals $X_0$, $Y_0$, $x_1$ and $y_1$ and feeds a logical product of these signals.

Figure 7:
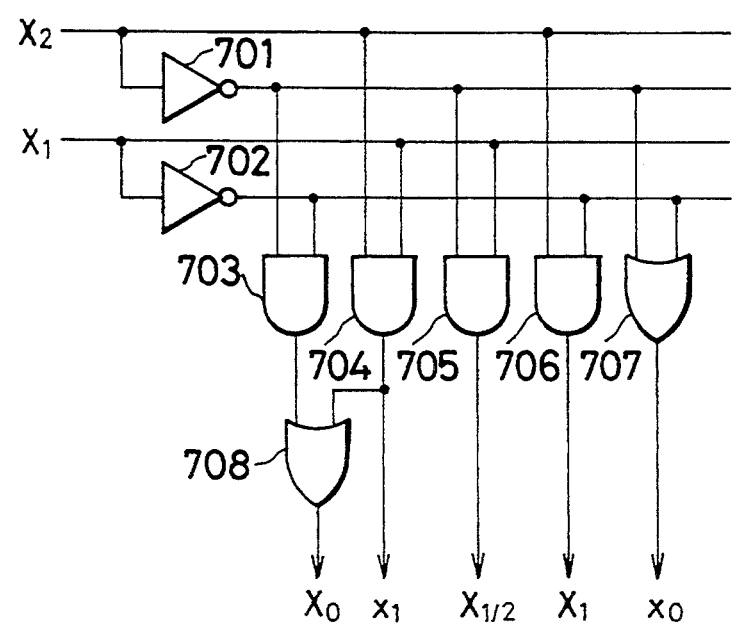
FIG. 7 is a circuit diagram showing an arrangement of a binary I/O circuit with two values which may apply to the ternary multiplier shown in FIG. 6 and FIG. 1.
Figure 8:
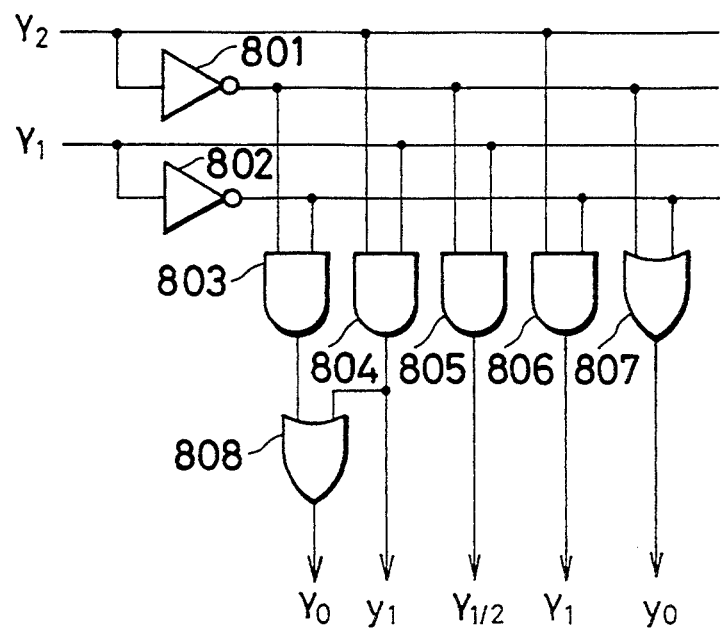
FIG. 8 is a circuit diagram showing another arrangement of a binary I/O circuit with two values which may apply to the ternary multiplier shown in FIG. 8 and FIG. 1.
Figure 9:
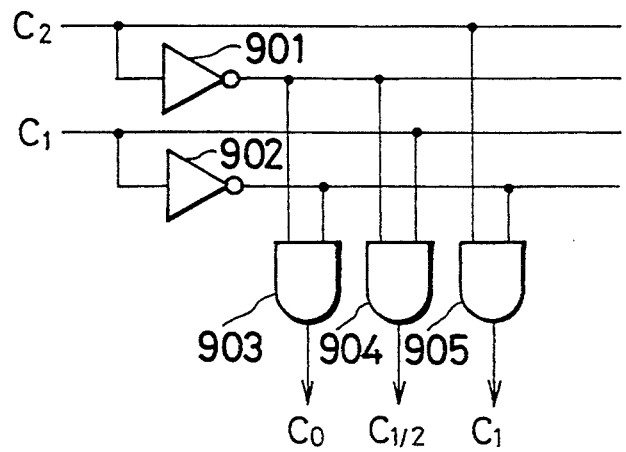
FIG. 9 is a circuit diagram showing another arrangement of a binary I/O circuit with two values which may apply to the ternary multiplier shown in FIG. 6 and FIG. 1.

FIG. 6 shows a ternary multiplier arranged to have binary I/O circuits shown in FIGS. 7 to 9.

Next, the description will be oriented to an operation of the binary input circuit shown in FIG. 7.

The NOT element 701 receives a two-bit parallel binary signal $X_2$ and feeds the inverted signal. The NOT element 702 receives a two-bit parallel binary signal $X_1$ and feeds the inverted signal.

The AND element 703 receives an output from the NOT element 702 and an output from the NOT element 701 and feeds a logic product of the two signals.

The AND element 704 receives the binary signal $X_2$ and $X_1$ and feeds a binary signal $x_1$ as a logical product of the two signals.

The OR element 708 receives the outputs from the AND elements 703 and 704 and feeds the binary signal $X_0$ as a logical sum of the two signals.

The AND element 705 receives an output from the NOT element 701 and the binary signal $X_1$ and feeds a binary signal $X_{\frac{1}{2}}$ as a logical product of the two signals.

The AND element 706 receives an output from the NOT element 702 and the binary signal $X_2$ and feeds a binary signal $X_1$ as a logical product of the two signals.

The OR element 707 receives the outputs from the NOT element 701 and 702 and feeds a binary signal $x_0$ as a logical sum of the two signals.

Next, the description will be oriented to an operation of the binary input circuit shown in FIG. 8.

The NOT element 801 receives a two-bit parallel binary signal $Y_2$ and feeds the inverted signal. The NOT element 802 receives a two-bit parallel binary signal $Y_1$ and feeds the inverted signal.

The AND element 803 receives an output from the NOT element 802 and an output from the NOT element 801 and feeds a logic product of the two signals.

The AND element 804 receives the binary signal $Y_2$ and $Y_1$ and feeds a binary signal $y_1$ as a logical product of the two signals.

The OR element 808 receives the outputs from the AND elements 803 and 804 and feeds the binary signal $Y_0$ as a logical sum of the two signals.

The AND element 805 receives an output from the NOT element 801 and the binary signal $Y_1$ and feeds a binary signal $Y_{\frac{1}{2}}$ as a logical product of the two signals.

The AND element 806 receives an output from the NOT element 802 and the binary signal $Y_2$ and feeds a binary signal $Y_1$ as a logical product of the two signals.

The OR element 807 receives the outputs from the NOT element 801 and 802 and feeds a binary signal $y_0$ as a logical sum of the two signals.

Next, the description will be oriented to an operation of the binary input circuit shown in FIG. 9.

The NOT element 901 receives a two-bit parallel binary signal $C_2$ and feeds an inverted signal. The NOT element 902 receives a two-bit parallel binary signal $C_1$ and feeds an inverted signal.

The AND element 903 receives an output from the NOT elements 901 and 902 and feed a binary signal $C_0$ as a logical product of the two signals.

The AND element 904 receives the output from the NOT element 901 and the binary signal $C_1$ and feeds a binary signal $C_{\frac{1}{2}}$ as a logical product of the two signals.

The AND element 905 receives the binary signal $C_2$ and the output from the NOT element 902 and feeds the binary signal $C_1$ as a logical product of the two signals.

As described above, in the ternary multiplier shown in FIGS. 2 to 4, the binary input signal is converted into a ternary output signal. In the multiplier shown in FIGS. 7 to 9, the input signal is binary and the output signal is binary as well.

Chart 3 and 4 indicates the substantially same logic as those of the aforementioned multiplier, except that they have $x_0X_0$, $X_{\frac{1}{2}}$, $X_1$, $x_1X_0$ and $y_0Y_0$, $Y_{\frac{1}{2}}$, $Y_1$, $y_1Y_0$.

Chart 3

| | | $C_0$ | | | | $C_{\frac{1}{2}}$ | | | | $C_1$ | | | |
|---|---|---|---|---|---|---|---|---|---|---|---|---|---|
| | | $x_0X_0$ | $X_{\frac{1}{2}}$ | $X_1$ | $x_1X_0$ | $x_0X_0$ | $X_{\frac{1}{2}}$ | $X_1$ | $x_1X_0$ | $x_0X_1$ | $X_{\frac{1}{2}}$ | $X_1$ | $x_1X_0$ |
| $y_0$ | $Y_0$ | | | | | 1 | 1 | 1 | 1 | 2 | 2 | 2 | 2 |
| | $Y_{\frac{1}{2}}$ | 1 | 2 | 3 | 1 | 2 | 3 | | 2 | 3 | | | 1 |
| | $Y_1$ | 2 | | 2 | 1 | 3 | 1 | 3 | 2 | | 2 | | |
| $y_1$ | $Y_0$ | 3 | 2 | 1 | 1 | | 3 | 2 | 2 | 1 | | | 3 |

$<Z', Z>$

Chart 4

| | | $C_0$ | | | | $C_{\frac{1}{2}}$ | | | | $C_1$ | | | |
|---|---|---|---|---|---|---|---|---|---|---|---|---|---|
| | | $x_0X_0$ | $X_{\frac{1}{2}}$ | $X_1$ | $x_1X_0$ | $x_0X_0$ | $X_{\frac{1}{2}}$ | $X_1$ | $x_1X_0$ | $x_0X_0$ | $X_{\frac{1}{2}}$ | $X_1$ | $x_1X_0$ |
| $y_0$ | $Y_0$ | | | | | | | | | | | | |
| | $Y_{\frac{1}{2}}$ | | | | | | | | 1 | | | 1 | 1 |
| | $Y_1$ | | 1 | 1 | | | 1 | 1 | | | 1 | 1 | 2 |
| $y_1$ | $Y_0$ | | 1 | 2 | | 1 | 1 | 2 | | 1 | 2 | 2 | |

$<C'>$

The chart 3 and 4 also show logical formulas, on which the ternary multiplier shown in FIG. 6 is arranged.

The output signals appearing in FIG. 7, $X_0$, $x_1$, $X_{\frac{1}{2}}$, $X_1$ and $x_0$ may be used in the binary input signals $X_0$, $X_{\frac{1}{2}}$, $X_1$, $x_0$ and $x_1$ for the ternary multiplier shown in FIGS. 1 or 6. Likewise, the output signals appearing in FIG. 8, $Y_0$, $y_1$, $Y_{\frac{1}{2}}$, $Y_1$ and $y_0$ may be used in the binary input signals $Y_0$, $y_1$, $Y_{\frac{1}{2}}$, $Y_1$ and $y_0$ for the ternary multiplier of FIG. 1. The carry signals appearing in FIG. 9, $C_0$, $C_{\frac{1}{2}}$ and $C_1$ may be replaced with the output signals $C_0$, $C_{\frac{1}{2}}$ and $C_1$ of the equivalent circuit shown in FIG. 1. In addition, although the binary signal and the ternary signal are not treated at a time, the combination of these signals may be allowed.

Figure 10A:
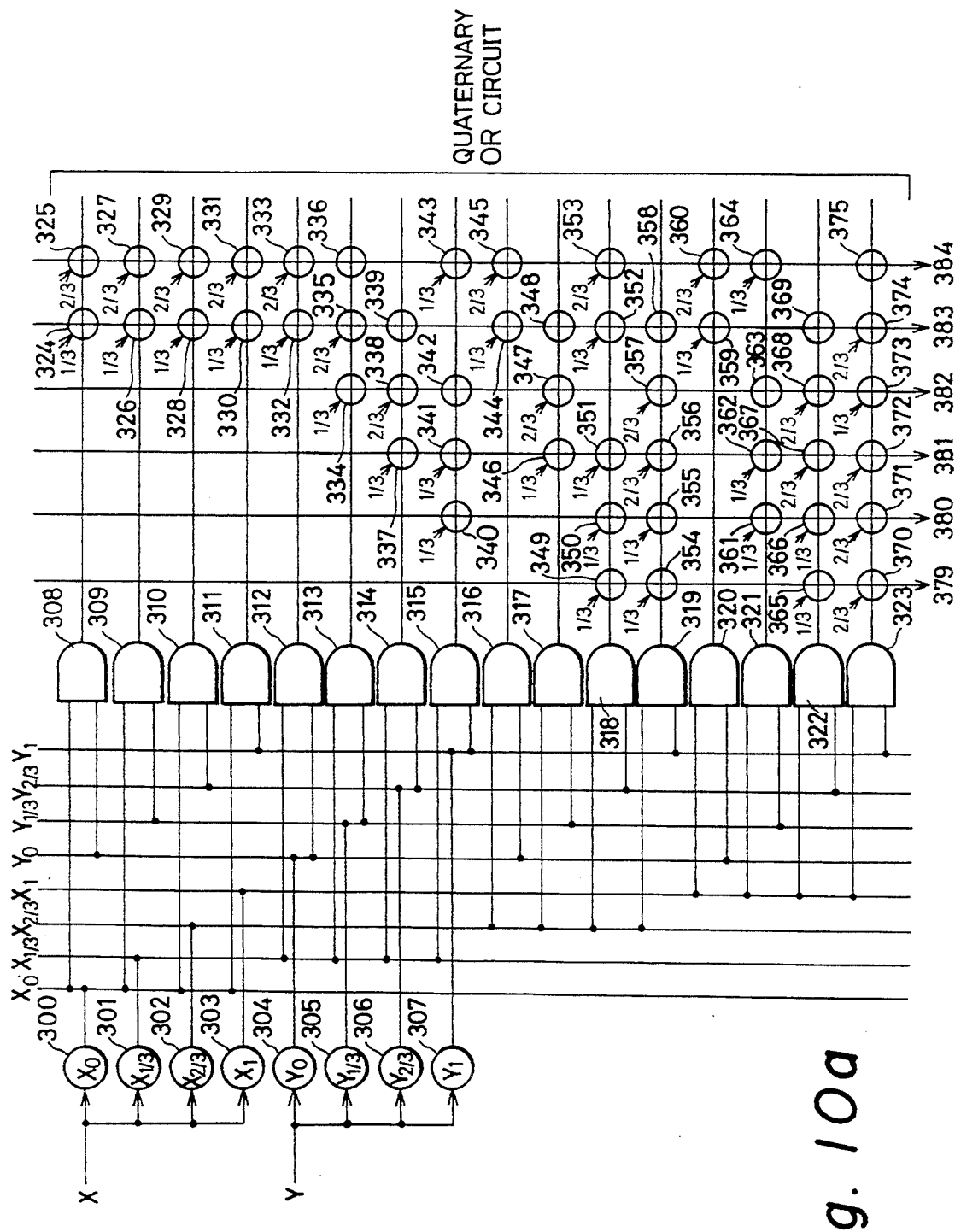
FIG. 10 composed of FIGS. 10a and 10b is a circuit diagram showing an arrangement of a quaternary multiplier according to a third embodiment of the present invention.
Figure 10B:
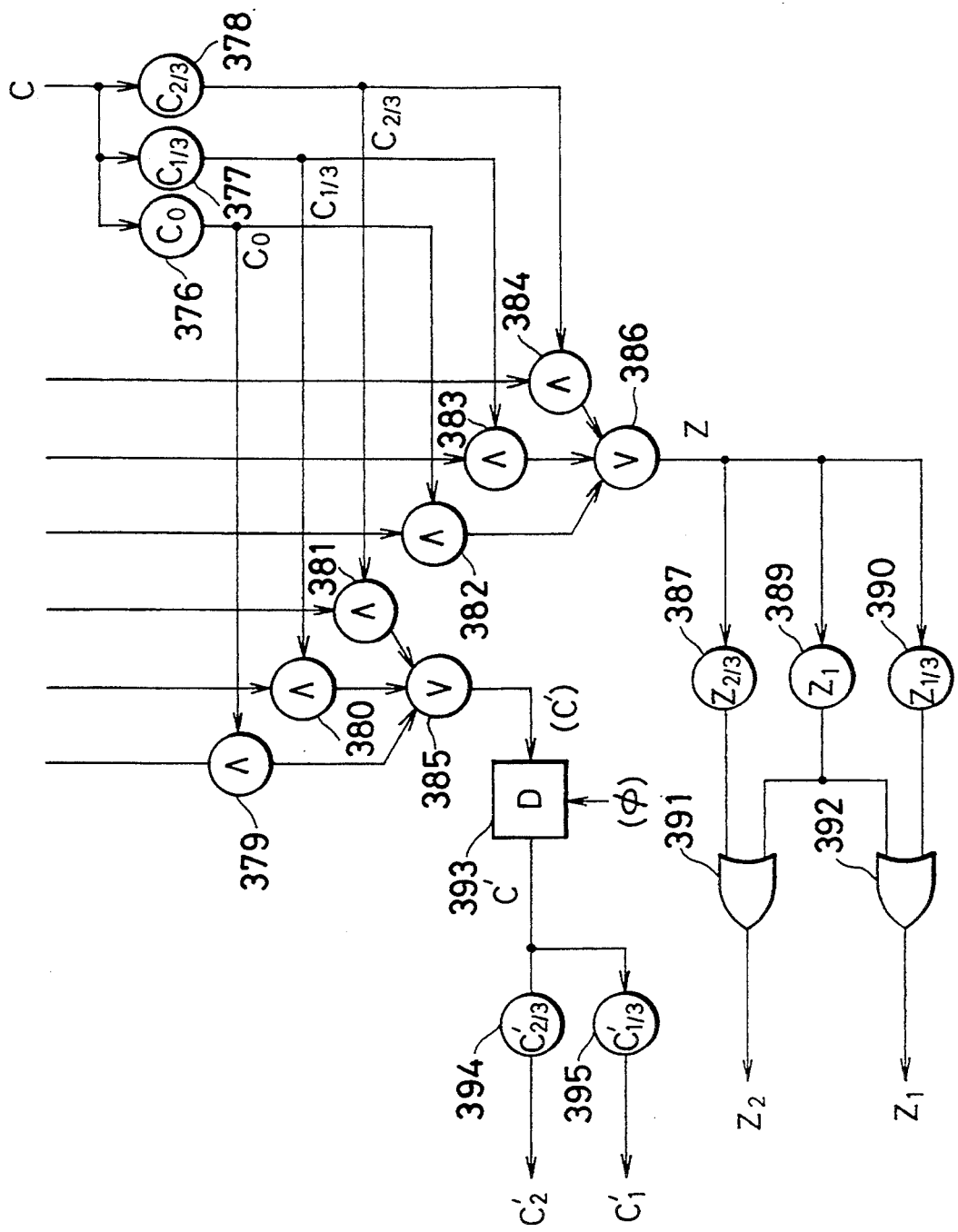

FIG. 10 composed of FIGS. 10a and 10b is a block diagram showing a quaternary multiplier according to a third embodiment of the present invention.

For describing the quaternary multiplier shown in FIG. 10, a quantizing functional element (referred to as a quantizing element) is used for a multivalued functional element.

The quaternary multiplier shown in FIG. 10 is arranged to have I/O elements 300 to 307, AND elements 308 to 323, quantizing elements 324 to 375, I/O elements 376 to 378, AND elements 379 to 384, OR elements 385 and 386, I/O elements 387 to 390, OR elements 391 and 392, a one-bit delay circuit 393, I/O elements 394 and 395.

Then, each of the components will be described.

The I/O element 300 receives a quaternary output signal X and feeds a binary input signal $X_0$. The I/O element 301 receives a quaternary output signal X and feeds a binary input signal $X_{\frac{1}{3}}$. The I/O element 302 receives a quaternary output signal X and feeds a binary input signal $X_{\frac{2}{3}}$. The I/O element 303 receives a quaternary output signal X and feeds a binary input signal $X_1$.

The I/O element 304 receives a quaternary output signal Y and feeds a binary input signal $Y_0$. The I/O element 305 receives a quaternary output signal Y and feeds a binary input signal $Y_{\frac{1}{3}}$. The I/O element 306 receives a quaternary output signal Y and feeds a binary input signal $Y_{\frac{2}{3}}$. The I/O element 307 receives a quaternary output signal Y and feeds a binary input signal $Y_1$.

The AND element 308 receives binary input signals $X_0$ and $Y_0$ and feeds a logical product of these signals. The AND element 309 receives binary input signals $X_0$ and $Y_{\frac{1}{3}}$ and feeds a logical product of these signals. The AND element 310 receives binary input signals $X_0$ and $Y_{\frac{2}{3}}$ and feeds a logical product of these signals. The AND element 311 receives binary input signals $X_0$ and $Y_1$ and feeds a logical product of these signals. The AND element 312 receives binary input signals $X_{\frac{1}{3}}$ and $Y_0$ and feeds a logical product of these signals. The AND element 313 receives binary input signals $X_{\frac{1}{3}}$ and $Y_{\frac{1}{3}}$ and feeds a logical product of these signals. The AND element 314 receives binary input signals $X_{\frac{1}{3}}$ and $Y_{\frac{2}{3}}$ and feeds a logical product of these signals. The AND element 315 receives binary input signals $X_{\frac{1}{3}}$ and $Y_1$ and feeds a logical product of these signals. The AND element 316 receives binary input signals $X_{\frac{2}{3}}$ and $Y_0$ and feeds a logical product of these signals. The AND element 317 receives binary input signals $X_{\frac{2}{3}}$ and $Y_{\frac{1}{3}}$ and feeds a logical product of these signals. The AND element 318 receives binary input signals $X_{\frac{2}{3}}$ and $Y_{\frac{2}{3}}$ and feeds a logical product of these signals. The AND element 319 receives binary input signals $X_{\frac{2}{3}}$ and $Y_1$ and feeds a logical product of these signals. The AND element 320 receives binary input signals $X_1$ and $Y_0$ and feeds a logical product of these signals. The AND element 321 receives binary input signals $X_1$ and $Y_{\frac{1}{3}}$ and feeds a logical product of these signals. The AND element 322 receives binary input signals $X_1$ and $Y_{\frac{2}{3}}$ and feeds a logical product of these signals. The AND element 323 receives binary input signals $X_1$ and $Y_1$ and feeds a logical product of these signals.

Then, the description will be oriented to the quantizing elements.

The quantizing element 324 receives an output from the AND element 308 and feeds a quaternary threshold value. The quantizing element 325 receives an output from the AND element 308 and feeds a quaternary threshold value.

The quantizing element 326 receives an output from the AND element 309 and feeds a quaternary threshold value. The quantizing element 327 receives an output from the AND element 309 and feeds a quaternary threshold value.

The quantizing element 328 receives an output from the AND element 310 and feeds a quaternary threshold value. The quantizing element 329 receives an output from the AND element 310 and feeds a quaternary threshold value.

The quantizing element 330 receives an output from the AND element 311 and feeds a quaternary threshold value. The quantizing element 331 receives an output from the AND element 311 and feeds a quaternary threshold value.

The quantizing element 332 receives an output from the AND element 312 and feeds a quaternary threshold value. The quantizing element 333 receives an output from the AND element 312 and feeds a quaternary threshold value.

The quantizing element 334 receives an output from the AND element 313 and feeds a quaternary threshold value. The quantizing element 335 receives an output from the AND element 313 and feeds a quaternary threshold value. The quantizing element 336 receives an output from the AND element 313 and feeds a binary threshold value.

The quantizing element 337 receives an output from the AND element 314 and feeds a quaternary threshold value. The quantizing element 338 receives an output from the AND element 314 and feeds a quaternary threshold value. The quantizing element 339 receives an output from the AND element 314 and feeds a binary threshold value.

The quantizing element 340 receives an output from the AND element 315 and feeds a quaternary threshold value. The quantizing element 341 receives an output from the AND element 315 and feeds a quaternary threshold value. The quantizing element 342 receives an output from the AND element 315 and feeds a binary threshold value. The quantizing element 343 receives an output from the AND element 315 and feeds a quaternary threshold value.

The quantizing element 344 receives an output from the AND element 316 and feeds a quaternary threshold value. The quantizing element 345 receives an output from the AND element 316 and feeds a quaternary threshold value.

The quantizing element 346 receives an output from the AND element 317 and feeds a quaternary threshold value. The quantizing element 847 receives an output from the AND element 317 and feeds a quaternary threshold value. The quantizing element 348 receives an output from the AND element 317 and feeds a binary threshold value.

The quantizing element 349 receives an output from the AND element 318 and feeds a quaternary threshold value. The quantizing element 350 receives an output from the AND element 318 and feeds a quaternary threshold value. The quantizing element 351 receives an output from the AND element 318 and feeds a quaternary threshold value. The quantizing element 352 receives an output from the AND element 318 and feeds a quaternary threshold value. The quantizing element 353 receives an output from the AND element 318 and feeds a quaternary threshold value.

The quantizing element 354 receives an output from the AND element 319 and feeds a quaternary threshold value. The quantizing element 355 receives an output from the AND element 319 and feeds a quaternary threshold value. The quantizing element 356 receives an output from the AND element 319 and feeds a quaternary threshold value. The quantizing element 357 receives an output from the AND element 319 and feeds a quaternary threshold value. The quantizing element 358 receives an output from the AND element 319 and feeds a binary threshold value.

The quantizing element 359 receives an output from the AND element 320 and feeds a quaternary threshold value. The quantizing element 360 receives an output from the AND element 320 and feeds a quaternary threshold value.

The quantizing element 361 receives an output from the AND element 321 and feeds a quaternary threshold value. The quantizing element 362 receives an output from the AND element 321 and feeds a quaternary threshold value. The quantizing element 363 receives an output from the AND element 321 and feeds a binary threshold value. The quantizing element 364 receives an output from the AND element 321 and feeds a quaternary threshold value.

The quantizing element 365 receives an output from the AND element 322 and feeds a quaternary threshold value. The quantizing element 366 receives an output from the AND element 322 and feeds a quaternary threshold value. The quantizing element 367 receives an output from the AND element 322 and feeds a quaternary threshold value. The quantizing element 368 receives an output from the AND element 322 and feeds a quaternary threshold value. The quantizing element 369 receives an output from the AND element 322 and feeds a binary threshold value.

The quantizing element 370 receives an output from the AND element 323 and feeds a quaternary threshold value. The quantizing element 371 receives an output from the AND element 323 and feeds a quaternary threshold value. The quantizing element 372 receives an output from the AND element 323 and feeds a quaternary threshold value. The quantizing element 373 receives an output from the AND element 323 and feeds a quaternary threshold value. The quantizing element 374 receives an output from the AND element 323 and feeds a quaternary threshold value. The quantizing element 375 receives an output from the AND element 323 and feeds a binary threshold value.

The I/O element 376 receives a quaternary carry input C and feeds a carry input signal $C_0$. The I/O element 377 receives a quaternary carry input C and feeds a carry input signal $C_{\frac{1}{3}}$. The I/O element 378 receives a quaternary carry input C and feeds a carry input signal $C_{\frac{2}{3}}$.

The AND element 379 receives any one of the outputs of the quantizing elements 349, 354, 365 and 370 and the carry input signal $C_0$ sent from the I/O element 376 and feeds a logical product of these signals. The AND element 380 receives any one of the outputs of the quantizing elements 340, 350, 355, 361, 366 and 371 and the carry input signal $C_{\frac{1}{3}}$ sent from the I/O element 377 and feeds a logical product of these signals. The AND element 381 receives any one of the outputs of the quantizing elements 337, 346, 351, 356, 362, 367 and 372 and the carry input signal $C_{\frac{2}{3}}$ sent from the I/O element 378 and feeds a logical product of these signals.

The OR element 385 receives the outputs from the AND elements 379, 380 and 381 and feeds a logical sum (OR) of these signals, that is, a carry output signal (C'). The one-bit delay circuit 393 receives the carry output signal (C') from the OR element 385 and feeds the carry output C'.

The I/O element 394 receives the carry output C' sent from the one-bit delay circuit 393 and feeds a carry output $C'_2$. The I/O element 395 receives the carry output C' sent from the one-bit delay circuit 393 and feeds a carry output $C'_1$.

The AND element 382 receives any one of the outputs from the quantizing elements 334, 338, 342, 347, 357, 363, 368 and 373 and the carry input signal $C_0$ sent from the I/O element 376 and feeds a logical product of these signals. Likewise, the AND element 383 receives any one of the outputs from the quantizing elements 324, 326, 328, 330, 332, 335, 339, 344, 348, 352, 358, 359, 369 and 374 and the carry input signal $C_{\frac{1}{3}}$ sent from the I/O element 377 and feeds a logical product of these signals. The AND element 384 receives any one of the outputs from the quantizing elements 325, 327, 329, 331, 333, 336, 343, 345, 353, 360, 364 and 375 and the carry input signal $C_{\frac{2}{3}}$ sent from the I/O element 378 and feeds a logical product of these signals.

The OR element 386 receives the outputs from the AND elements 382, 383 and 384 and feeds a multiplied output Z corresponding to a logical sum (OR) of these signals. The I/O element 387 receives the multiplied output Z and feeds a multiplied output $Z_{\frac{2}{3}}$ to the OR element 391. The I/O element 389 receives the multiplied output Z and feeds a multiplied output $Z_1$ to the OR element 391, 392. The I/O element 390 receives the multiplied output Z and feeds the multiplied output $Z_{\frac{1}{3}}$ to the OR element 392.

Figure 11:
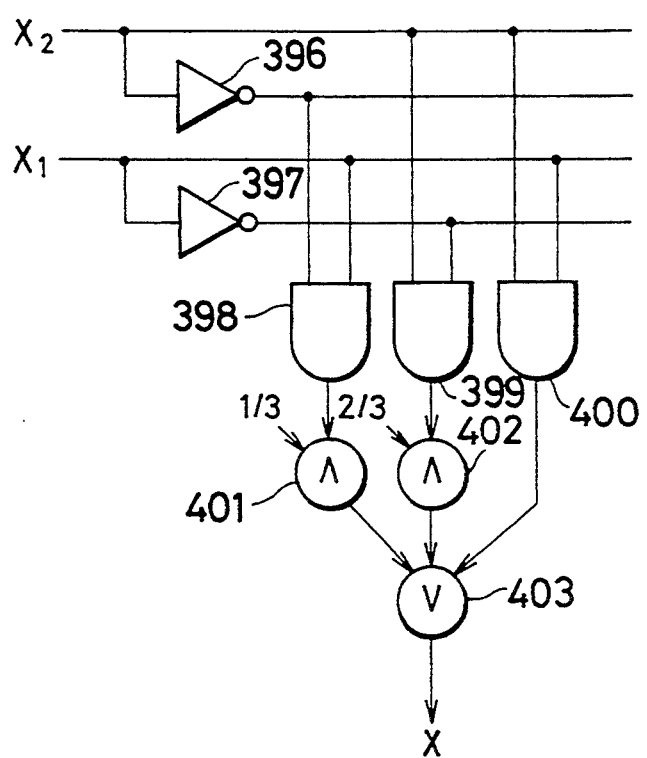
FIG. 11 is a circuit diagram showing an arrangement of a binary I/O circuit with four values which may apply to the quaternary multiplier shown in FIG. 10.

The input X shown in FIG. 10 is obtained by the binary input circuit shown in FIG. 11, which is arranged to have NOT circuit elements (referred to as NOT elements) 396 and 397, AND elements 398 to 400, AND elements 401 and 402, and an OR element 403.

Next, the description will be oriented to the operation of the binary input circuit shown in FIG. 11.

The NOT element 396 receives a two-bit parallel binary input signal $X_2$ and feeds the signal. Likewise, the NOT element 397 receives a two-bit parallel binary input signal $X_1$ and feeds the signal.

The AND element 398 receives the output from the NOT element 396 and the binary input signal $X_1$ and feeds a logical product of these signals. The AND element 401 receives an output of the AND element 398 and a signal with a value of $\frac{1}{3}$ and feeds a logical product of these signals. The AND element 399 receives the output from the NOT element 397 and the binary input signal $X_2$ and feeds a logical product of these signals. The AND element 402 receives the output from the AND element 399 and a signal with a value of $\frac{2}{3}$ and feeds a logical product of these signals.

An OR element 403 receives the outputs from the AND elements 400, 401 and 402 and feeds a quaternary output signal X corresponding a logical sum (OR) of these signals.

Figure 12:
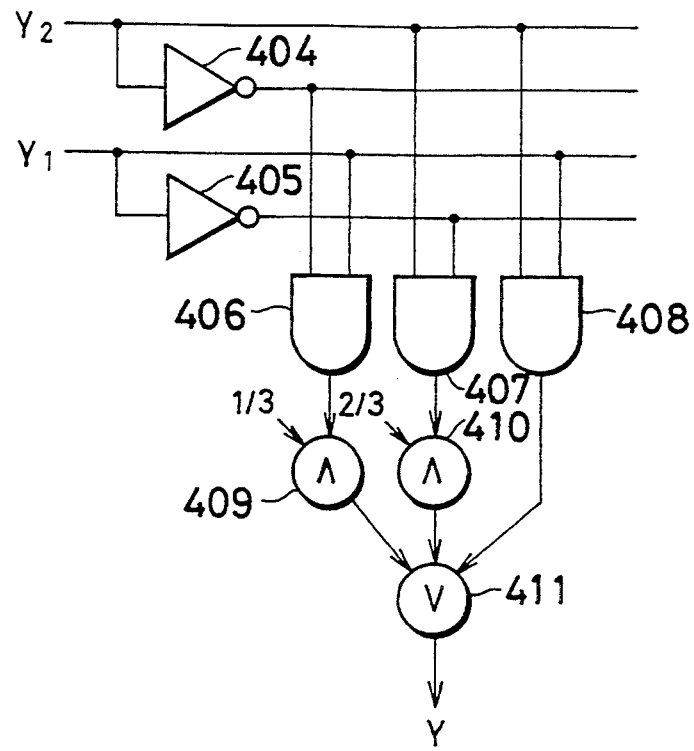
FIG. 12 is a circuit diagram showing an arrangement of a binary I/O circuit with four values which may apply to the quaternary multiplier shown in FIG. 10.

The input Y shown in FIG. 10 is obtained from the binary input circuit shown in FIG. 12, which is arranged to have NOT elements 404 and 405, AND elements 408 to 408, AND elements 409 and 410, and an OR element 411 like the binary input circuit shown in FIG. 11.

Next, the description will be oriented to the operation of the binary input circuit shown in FIG. 12.

The NOT element 404 receives a two-bit parallel binary input signal $Y_2$ and feeds the signal. The NOT element 405 receives a two-bit parallel binary input signal $Y_1$ and feeds the signal.

The AND element 406 receives the output from the NOT element 404 and the binary input signal $Y_1$ and feeds a logical product of these signals. The AND element 409 receives the output from the AND element 406 and a signal with a value of $\frac{1}{3}$ and feeds a logical product of these signals. The AND element 407 receives the output from the NOT element 405 and the binary input signal Y₂ and feeds a logical product of these signals. The AND element 410 receives the output from the AND element 407 and a signal with a value of $\frac{2}{3}$ and feeds a logical product of these signals.

The OR element 411 receives the outputs from the AND element 408, 409 and 410 and feeds a quaternary output signal Y corresponding to a logical sum (OR) of these outputs.

Figure 13:
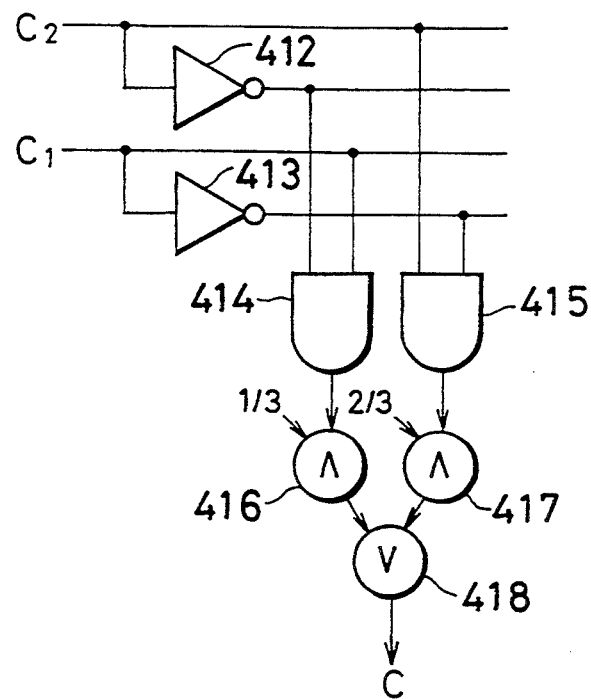
FIG. 13 ms a circuit diagram showing another arrangement of a binary I/O circuit with four values which may apply to the quaternary multiplier shown in FIG. 10.

Further, the input C shown in FIG. 10 is obtained from the binary input circuit shown in FIG. 13, which is arranged to have NOT elements 412 and 413, AND elements 414 and 415, AND elements 416 and 417, and an OR element 418.

Next, the description will be oriented to the operation of the binary input circuit shown in FIG. 13.

The NOT element 412 receives a two-bit parallel binary input signal C₂ and feeds the signal. The NOT element 413 receives a two-bit parallel binary input signal C₁ and feeds the signal.

The AND element 414 receives the output from the NOT element 412 and the binary input signal C₁ and feeds a logical product of these signals. The AND element 416 receives the output from the AND element 414 and a signal with a value of $\frac{1}{3}$ and feeds a logical product of these signals. The AND element 415 receives the output from the NOT element 413 and the binary input signal C₂ and feeds a logical product of these signals. The AND element 417 receives the output from the AND element 415 and a signal with a value of $\frac{2}{3}$ and feeds a logical product of these signals.

The OR element 418 receives the output from the AND element 416 and the output from the AND element 417 and feeds a quaternary output signal C corresponding to a logical sum (OR) of these signals.

Table 8 lists codes allocated fro the two-bit parallel binary input signals X₂, X₁, Y₂ and Y₁, the quaternary output signals X and Y, and the carry inputs C₂, C₁ and C.

TABLE 4

| X₂ | X₁ | Y₂ | Y₁ | X | Y | C₂ | C₁ | C |
|----|----|----|----|---|---|----|----|---|
| 0 | 0 | 0 | 0 | 0 | 0 | 0 | 0 | 0 |
| 0 | 1 | 0 | 1 | $\frac{1}{3}$ | $\frac{1}{3}$ | 0 | 1 | $\frac{1}{3}$ |
| 1 | 0 | 1 | 0 | $\frac{2}{3}$ | $\frac{2}{3}$ | 1 | 0 | $\frac{2}{3}$ |
| 1 | 1 | 1 | 1 | 1 | 1 | — | — |   |

The expressions (4), (5) and (6) are logical formulas corresponding to the table 4.

$$X = \tfrac{1}{3}\overline{X_2} X_1 + \tfrac{2}{3} X_2 \overline{X_1} + X_2 X_1 \tag{4}$$

$$Y = \tfrac{1}{3}\overline{Y_2} Y_1 + \tfrac{2}{3} Y_2 \overline{Y_1} + Y_2 Y_1 \tag{5}$$

$$C = \tfrac{1}{3}\overline{C_2} C_1 + \tfrac{2}{3} C_2 \overline{C_1} \tag{6}$$

Chart 5 lists the logic built in the quaternary multiplier. Chart 6 lists the carry outputs of the quaternary multiplier.

Chart 5

| | ←── $C_0$ ──→ | | | | ←── $C_{\frac{1}{3}}$ ──→ | | | | ←── $C_{\frac{2}{3}}$ ──→ | | | |
|---|---|---|---|---|---|---|---|---|---|---|---|---|
| | $X_0$ | $X_{\frac{1}{3}}$ | $X_{\frac{2}{3}}$ | $X_1$ | $X_0$ | $X_{\frac{1}{3}}$ | $X_{\frac{2}{3}}$ | $X_1$ | $X_0$ | $X_{\frac{1}{3}}$ | $X_{\frac{2}{3}}$ | $X_1$ |
| $Y_0$ | | | | | 1 | 1 | 1 | 1 | 2 | 2 | 2 | 2 |
| $Y_{\frac{1}{3}}$ | | 1 | 2 | 3 | 1 | 2 | 3 | | 2 | 3 | | 1 |
| $Y_{\frac{2}{3}}$ | | 2 | | 2 | 1 | 3 | 1 | 3 | 2 | | 2 | |
| $Y_1$ | | 3 | 2 | 1 | 1 | | 3 | 2 | 2 | 1 | | 3 |

\<Z\>

Chart 6

| | ←── $C_0$ ──→ | | | | ←── $C_{\frac{1}{3}}$ ──→ | | | | ←── $C_{\frac{2}{3}}$ ──→ | | | |
|---|---|---|---|---|---|---|---|---|---|---|---|---|
| | $X_0$ | $X_{\frac{1}{3}}$ | $X_{\frac{2}{3}}$ | $X_1$ | $X_0$ | $X_{\frac{1}{3}}$ | $X_{\frac{2}{3}}$ | $X_1$ | $X_0$ | $X_{\frac{1}{3}}$ | $X_{\frac{2}{3}}$ | $X_1$ |
| $Y_0$ | | | | | | | | | | | | |
| $Y_{\frac{1}{3}}$ | | | | | | | | 1 | | | 1 | 1 |
| $Y_{\frac{2}{3}}$ | | | 1 | 1 | | 1 | 1 | | 1 | 1 | 1 | 2 |
| $Y_1$ | | | 1 | 2 | | 1 | 1 | 2 | | 1 | 2 | 2 |

\<C'\>

The symbols added to the quantizing elements indicate the physical functions listed in Table 5. These quantizing elements may be any one of several kinds of logical elements.

TABLE 5

| Symbol | Function |
|--------|----------|
| [ $\frac{1}{3}$ ╲ A. ╱ ⊕ ] | (1) Quaternary AND Circuit |
| | (2) Quaternary Threshold Value Element |
| | (3) Quantizing Function Element |
| | For the case A, any of these elements operates to logically feed a signal with a value of "0" or "$\frac{1}{3}$". |

TABLE 5-continued

| Symbol | Function |
|---|---|
| [symbol: square with ⅔ B. and crosshair] | For the case B, any of these elements operates to logically feed a signal with a value of "0" or "⅔". (1) Binary Threshold Element |
| [symbol: square with crosshair] | (2) Quantizing Functional Element Any of these elements operates to logically feed a signal with a value of "0" or "1". |

These logical elements may apply to the binary input circuits shown in FIGS. 11, 12 and 13 as well as the quaternary logic circuit (equivalent circuit, OR circuit, AND circuit, etc.) configuring the quaternary multiplier shown in FIG. 10.

Table 6 lists the quaternary multiplied output $<Z>$ and the binary multiplied output $<Z_2, Z_1>$ and a relation among codes.

TABLE 6

| Z | $Z_2$ | $Z_1$ |
|---|---|---|
| 0 | 0 | 0 |
| ⅓ | 0 | 1 |
| ⅔ | 1 | 0 |
| 1 | 1 | 1 |

In FIG. 6, $x_0$ and $x_1$ are shown by the equivalent circuits. In this case, since $x_0$ and $x_1$ are binary signals, they may be the output signals of x and x bar.

In the chart 5, a blank means 0, "1" means ⅓, "2" means ⅔, and "3" means 1, on which the quaternary multiplier shown in FIG. 10 is arranged.

In the chart 6, a blank means 0, "1" means ⅓ and "2" means ⅔, on which the quaternary multiplier is arranged.

FIG. 14 composed of FIGS. 14a and 14b shows a replacing circuit (see FIG. 14a) arranged to have the one-bit delay circuit 393 and the I/O elements 394 and 395, which are indicated in the arrangement of the quaternary multiplier shown in FIG. 10, and to feed the carry outputs $C_{2'}$ and $C_{1'}$ and another replacing circuit (see FIG. 14b) to be exchanged with the former replacing circuit as indicated by an arrow.

The replacing circuit shown in FIG. 14b is, as shown, arranged to have an I/O element 419 for receiving a carry output (C') and feeding a carry output $C_{⅔'}$, a delay circuit 420 for receiving the carry output $C_{⅔'}$ sent from the I/O element 419, delaying the output by one bit, and feeding the carry output $C_{2'}$, an I/O element 421 for receiving a carry output (C') and feeding a carry output $C_{⅓'}$ and a delay circuit 422 for receiving the carry output $C_{⅓'}$ sent from the I/O element 421, delaying the output by one bit and feeding the carry output $C_{1'}$, the description of which components are operated on the similar principle to those of the ternary multiplier and thus is not expanded herein.

Figure 15:
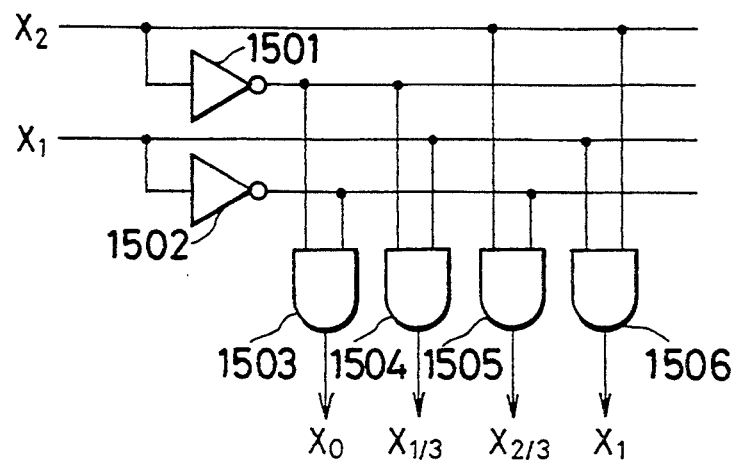
FIG. 15 is a circuit diagram showing another arrangement of a binary I/O circuit with two values which may apply to the quaternary multiplier shown in FIG. 10.
Figure 16:
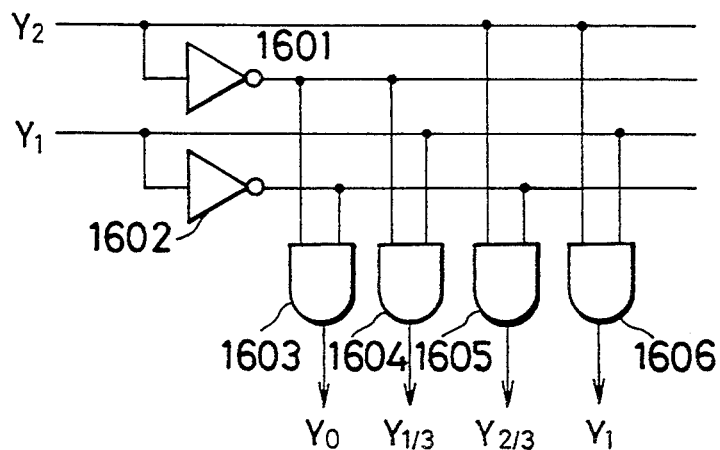
FIG. 16 is a circuit diagram showing another arrangement of a binary I/O circuit with two values which may apply to the quaternary multiplier shown in FIG. 10.
Figure 17:
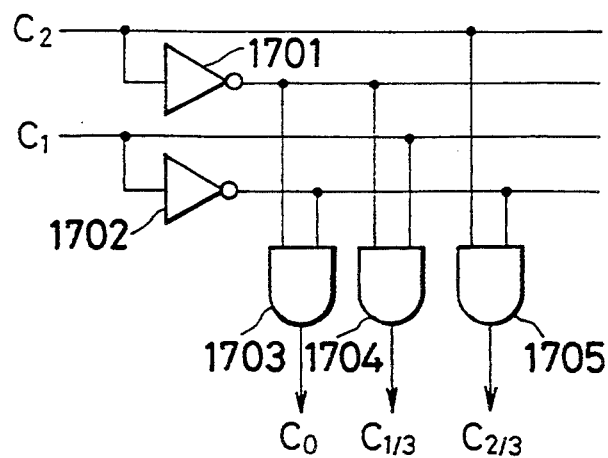
FIG. 17 is a circuit diagram showing another arrangement of a binary I/O circuit with two values which may apply to the quaternary multiplier shown in FIG. 10.

FIGS. 15 to 17 are circuit diagrams each showing a binary I/O circuit.

Next, the description will be oriented to an operation of the binary input circuit shown in FIG. 15.

The NOT element 1501 receives a two-bit parallel binary signal $X_2$ and feeds the inverted signal. The NOT element 1502 receives a two-bit parallel binary signal $X_1$ and feeds the inverted signal.

The AND element 1503 receives an output from the NOT element 1502 and an output from the NOT element 1501 and feeds a binary signal $X_0$ as a logic product of the two signals.

The AND element 1504 receives the output from the NOT element 1501 and the binary signal $X_1$ and feeds a binary signal $X_⅓$ as a logical product of the two signals.

The AND element 1505 receives the binary signal $X_2$ and the output from the NOT element 1502 and feeds a binary signal $X_⅔$ as a logical product of the two signals.

The AND element 1506 receives the binary signals $X_1$ and $X_2$ and feeds a binary signal $X_1$ as a logical product of the two signals.

Next, the description will be oriented to an operation of the binary input circuit shown in FIG. 16.

The NOT element 1601 receives a two-bit parallel binary signal $Y_2$ and feeds the inverted signal. The NOT element 1602 receives a two-bit parallel binary signal $Y_1$ and feeds the inverted signal.

The AND element 1603 receives an output from the NOT element 1602 and an output from the NOT element 1601 and feeds a binary signal $Y_0$ as a logic product of the two signals.

The AND element 1604 receives the output from the NOT element 1601 and the binary signal $Y_1$ and feeds a binary signal $Y_⅓$ as a logical product of the two signals.

The AND element 1605 receives the binary signal $Y_2$ and the output from the NOT element 1602 and feeds a binary signal $Y_⅔$ as a logical product of the two signals.

The AND element 1606 receives the binary signals $Y_1$ and $Y_2$ and feeds a binary signal $Y_1$ as a logical product of the two signals.

Next, the description will be oriented to an operation of the binary input circuit shown in FIG. 17.

The NOT element 1701 receives a two-bit parallel binary signal $C_2$ and feeds the inverted signal. The NOT element 1702 receives a two-bit parallel binary signal $C_1$ and feeds the inverted signal.

The AND element 1703 receives an output from the NOT element 1702 and an output from the NOT element 1701 and feeds a carry signal $C_0$ as a logic product of the two signals.

The AND element 1704 receives the output from the NOT element 1701 and the binary signal $C_1$ and feeds a carry signal $C_⅓$ as a logical product of the two signals.

The AND element 1705 receives the binary signal $C_2$ and the output from the NOT element 1702 and feeds a carry signal $C_⅔$ as a logical product of the two signals.

The output signals $X_0$, $X_⅓$, $X_⅔$ and $X_1$ shown in FIG. 15 may be used as binary input signals $X_0$, $X_⅓$, $X_⅔$ and $X_1$ to be treated in the quaternary multiplier shown in FIG. 10.

This holds true to the output signals $Y_0$, $Y_⅓$, $Y_⅔$ and $Y_1$ shown in FIG. 16 and the carry signals $C_0$, $C_⅓$ and $C_⅔$. Although the binary signal and the quaternary signal are not treated at a time, the combination of these signals is allowed to be used.

Figure 18:
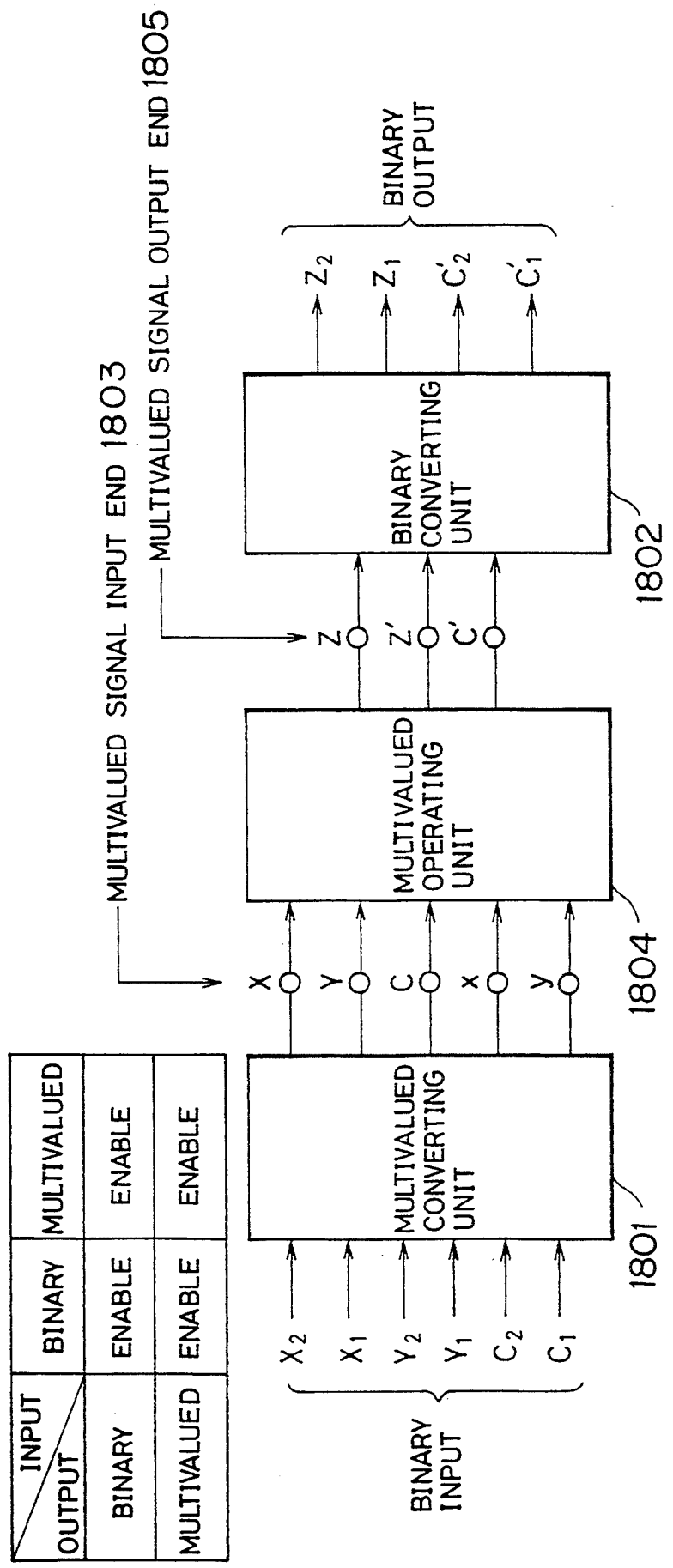
FIG. 18 is a circuit diagram showing an arrangement of an operating unit using a multivalued multiplier of the present invention.

FIG. 18 shows an arrangement of an operating device having a multivalued converting unit 1801, a binary converting unit 1802, a multivalued signal input end 1803, a multivalued operating unit 1804, and a multivalued signal outputting end 1805. When only the ternary input signal is treated, the ternary signal is just inputted from the multivalued signal input end 1803. The ternary multiplier shown in FIG. 1 or in FIG. 6 may be used for the multivalued operating device 1804. Further, when only the quaternary input signal are used, the quaternary input signal is just inputted from the multivalued signal input end 603. The quaternary multiplier shown in FIG. 10 may be used for the multivalued operating device 604.

In addition to the way of use described herein, various combinations of signals as shown in FIG. 18 is allowed to be implemented by combining binary signals and multivalued signals as I/O signals. The foregoing embodiment makes it possible to double the multiplying speed and keep the multiplying speed constant if the clock frequency is reduced into a half. This means lowering power consumption. Suppressing the circuit scale means reduction of logic elements (or circuit elements) composing the multiplier in number, thereby lowering the power consumption.

To increase the amount of bit signals to be treated at a time, the signal to be treated is multivalued. Hence, the multivalued functional elements may be used for the multiplier circuit for speeding up the operating speed without having to enlarge the hardware in scale.

The multivalued multiplier according to the present invention may be used for the multiplication included in the multiplying circuit, the dividing circuit, and the root operating circuit filed by the present inventors.

Next, the description will be oriented to a squaring circuit which performs a squaring operation, that is, one kind of multiplication according to a fourth embodiment of the present invention. This squaring circuit corresponds to the aforementioned ternary multiplier with a condition of $X=Y$ and $x=y$ or the aforementioned quaternary multiplier with a condition of $X=Y$. That is, for the ternary multiplier, this squaring circuit receives only signals indicated by X and x and for the quaternary multiplier, this squaring circuit receives only a signal indicated by X. This squaring circuit operates in an independent manner.

Figure 21:
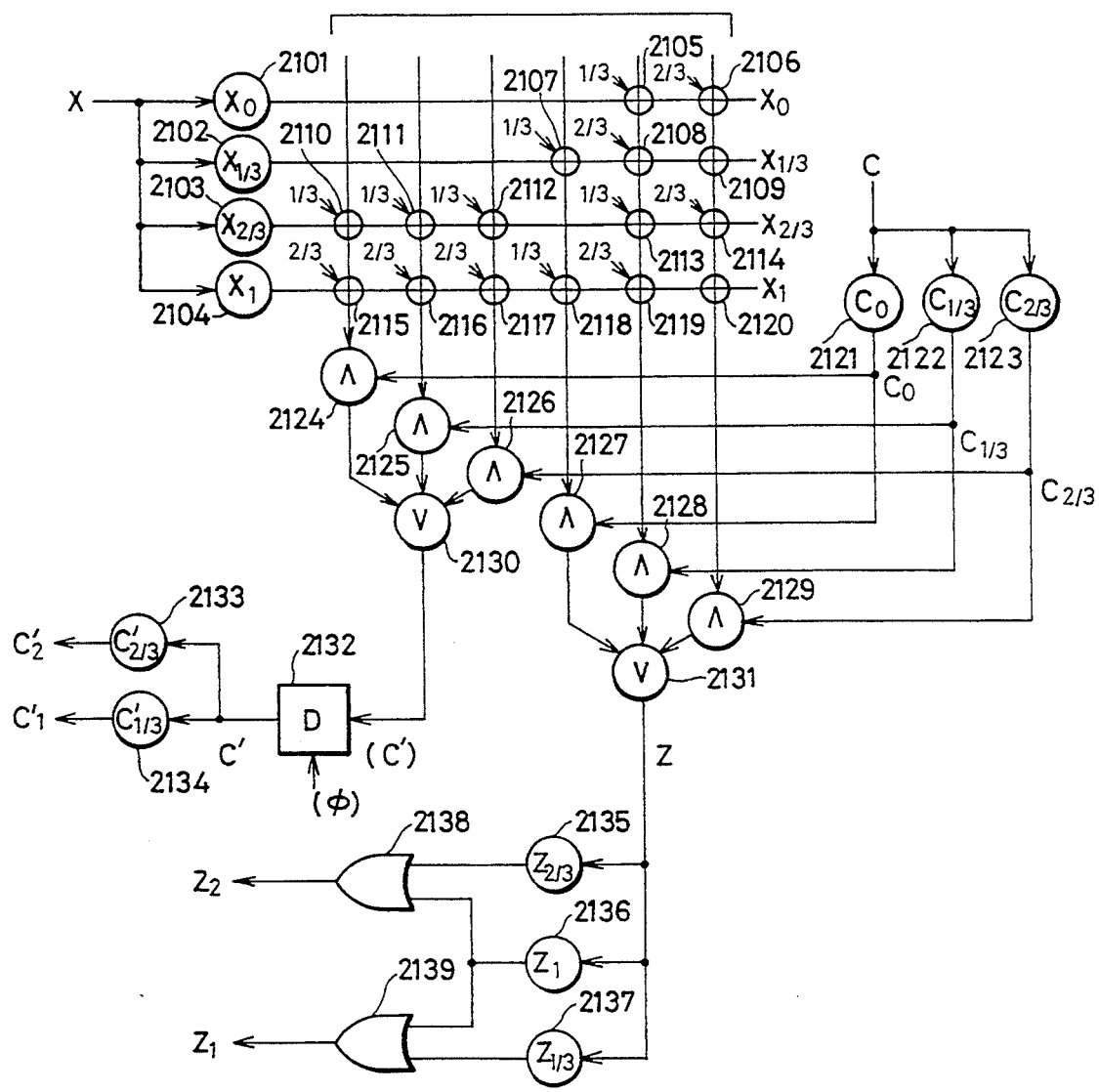
FIG. 21 is a circuit diagram showing a quaternary squaring circuit arranged by synthesizing the logic shown in FIGS. 19 and 20.

FIG. 19 shows a logic of a square $<Z>$ and FIG. 20 shows a logic of a carry $<C'>$. FIG. 21 shows a quaternary squaring circuit operating on the synthesized logic as shown in FIGS. 19 and 20.

The quaternary squaring circuit shown in FIG. 21 is arranged to have I/O elements 2101 to 2104, 2121 to 2123, and 2133 to 2137, multivalued functional elements 2105 to 2120, AND circuit elements (AND elements) 2124 to 2129, OR circuit elements (OR elements) 2130, 2131, a one-bit delay circuit 2132, OR circuit elements (OR elements) 2138, 2139.

Next, each of those components will be described.

The I/O element 2101 receives a quaternary signal X and feeds a binary signal $X_0$. The I/O element 2102 receives the quaternary signal X and feeds a binary signal $X_{\frac{1}{3}}$. The I/O element 2103 receives the quaternary signal X and feeds a binary signal $X_{\frac{2}{3}}$. The I/O element 2104 receives the quaternary signal X and feeds a binary signal $X_1$.

The multivalued functional element 2105 receives a "$\frac{1}{3}$" value signal and the binary signal $X_0$ output from the I/O element 2101 and feeds a binary threshold value. The multivalued functional element 2106 receives a "$\frac{2}{3}$" value signal and the binary signal $X_0$ output from the I/O element 2101 and feeds a binary threshold value.

The multivalued functional element 2107 receives a "$\frac{1}{3}$" value signal and the binary signal $X_{\frac{1}{3}}$ output from the I/O element 2102 and feeds a binary threshold value. The multivalued functional element 2108 receives a "$\frac{2}{3}$" value signal and the binary signal $X_{\frac{1}{3}}$ output from the I/O element 2102 and feeds a binary threshold value. The multivalued functional element 2109 receives the binary signal $X_{\frac{1}{3}}$ output from the I/O element 2102 and feeds a binary threshold value.

The multivalued functional element 2110 receives a "$\frac{1}{3}$" value signal and the binary signal $X_{\frac{2}{3}}$ output from the I/O element 2103 and feeds a binary threshold value. The multivalued functional element 2111 receives a "$\frac{1}{3}$" value signal and the binary signal $X_{\frac{2}{3}}$ output from the I/O element 2103 and feeds a binary threshold value. The multivalued functional element 2112 receives a "$\frac{1}{3}$" value signal and the binary signal $X_{\frac{2}{3}}$ output from the I/O element 2103 and feeds a binary threshold value. The multivalued functional element 2113 receives a "$\frac{1}{3}$" value signal and the binary signal $X_{\frac{2}{3}}$ output from the I/O element 2103 and feeds a binary threshold value. The multivalued functional element 2114 receives a "$\frac{2}{3}$" value signal and the binary signal $X_{\frac{2}{3}}$ output from the I/O element 2103 and feeds a binary threshold value.

The multivalued functional element 2115 receives a "$\frac{2}{3}$" value signal and the binary signal $X_1$ output from the I/O element 2104 and feeds a binary threshold value. The multivalued functional element 2116 receives a "$\frac{2}{3}$" value signal and the binary signal $X_1$ output from the I/O element 2104 and feeds a quaternary threshold value. The multivalued functional element 2117 receives a "$\frac{2}{3}$" value signal and the binary signal $X_1$ output from the I/O element 2104 and feeds a binary threshold value. The multivalued functional element 2118 receives a "$\frac{1}{3}$" value signal and the binary signal $X_1$ output from the I/O element 2104 and feeds a binary threshold value. The multivalued functional element 2119 receives a "$\frac{2}{3}$" value signal and the binary signal $X_1$ output from the I/O element 2104 and feeds a binary threshold value. The multivalued functional element 2120 receives the binary signal $X_1$ output from the I/O element 2104 and feeds a binary threshold value.

The I/O element 2121 receives a quaternary carry input C and feeds a carry signal $C_0$. The I/O element 2122 receives the quaternary carry input C and feeds a carry signal $C_{\frac{1}{3}}$. The I/O element 2123 receives the quaternary carry input C and feeds a carry signal $C_{\frac{2}{3}}$.

The AND element 2124 receives any one of the outputs from the multivalued functional elements 2110, 2115 and the carry signal $C_0$ from the I/O element 2121 and feeds a logical product (AND) of these two signals.

The AND element 2125 receives any one of the outputs from the multivalued functional elements 2111, 2116 and the carry signal $C_{\frac{1}{3}}$ from the I/O element 2122 and feeds a logical product (AND) of these two signals.

The AND element 2126 receives any one of the outputs from the multivalued functional elements 2112, 2117 and the carry signal $C_{\frac{2}{3}}$ from the I/O element 2123 and feeds a logical product (AND) of these two signals.

The OR element 2130 receives the outputs from the AND elements 2124, 2125 and 2126 and feeds a carry signal (C') corresponding to a logical sum (OR) of these signals. The one-bit delay circuit 2132 receives the carry signal (C') sent from the OR element 2130 and feeds another carry signal C' which is delayed by one-bit.

The I/O element 2133 receives the carry signal C' sent from the one-bit delay circuit 2132 and feeds a carry signal $C'_2$. The I/O element 2134 also receives the carry signal C' sent from the one-bit delay circuit 2132 and feeds a carry output $C'_1$.

The AND element 2127 receives any one of the outputs from the multivalued functional elements 2107, 2118 and the carry signal $C_0$ from the I/O element 2121 and feeds a logical product (AND) of these two signals.

The AND element 2128 receives any one of the outputs from the multivalued functional elements 2105, 2108, 2113, 2119 and the carry signal $C_{\frac{1}{3}}$ from the I/O element 2122 and feeds a logical product (AND) of these two signals.

The AND element 2129 receives any one of the outputs from the multivalued functional elements 2108, 2109, 2114, 2120 and the carry signal $C_{\frac{2}{3}}$ from the I/O element 2123 and feeds a logical product (AND) of these two signals.

The OR element 2131 receives the outputs from the AND elements 2127, 2128 and 2129 and feeds a multiplied output Z corresponding to a logical sum (OR) of these signals to the I/O elements 2135 to 2137.

The I/O element 2135 receives the multiplied output Z from the OR element 2131 and feeds a new multiplied output $Z_{\frac{2}{3}}$ to the OR element 2138. The I/O element 2136 receives the multiplied output Z from the OR element 2131 and feeds a new multiplied output $Z_1$ to the OR elements 2138, 2139. The I/O element 2137 receives the multiplied output Z from the OR element 2131 and feeds a new multiplied output $Z_{\frac{1}{3}}$ to the OR element 2139.

The OR element 2138 feeds a multiplied output $Z_2$ corresponding to a logical sum (OR) of the output from the I/O element 2135 and the output from the I/O element 2136. The OR element 2139 feeds a multiplied output $Z_1$ corresponding to a logical sum of the output from the I/O element 2136 and the output from the I/O element 2137.

Like the already-filed quaternary squaring circuit, however, the quaternary squaring circuit shown in FIG. 21 is arranged of multivalued functional elements or quantizing functional elements.

Figure 22:
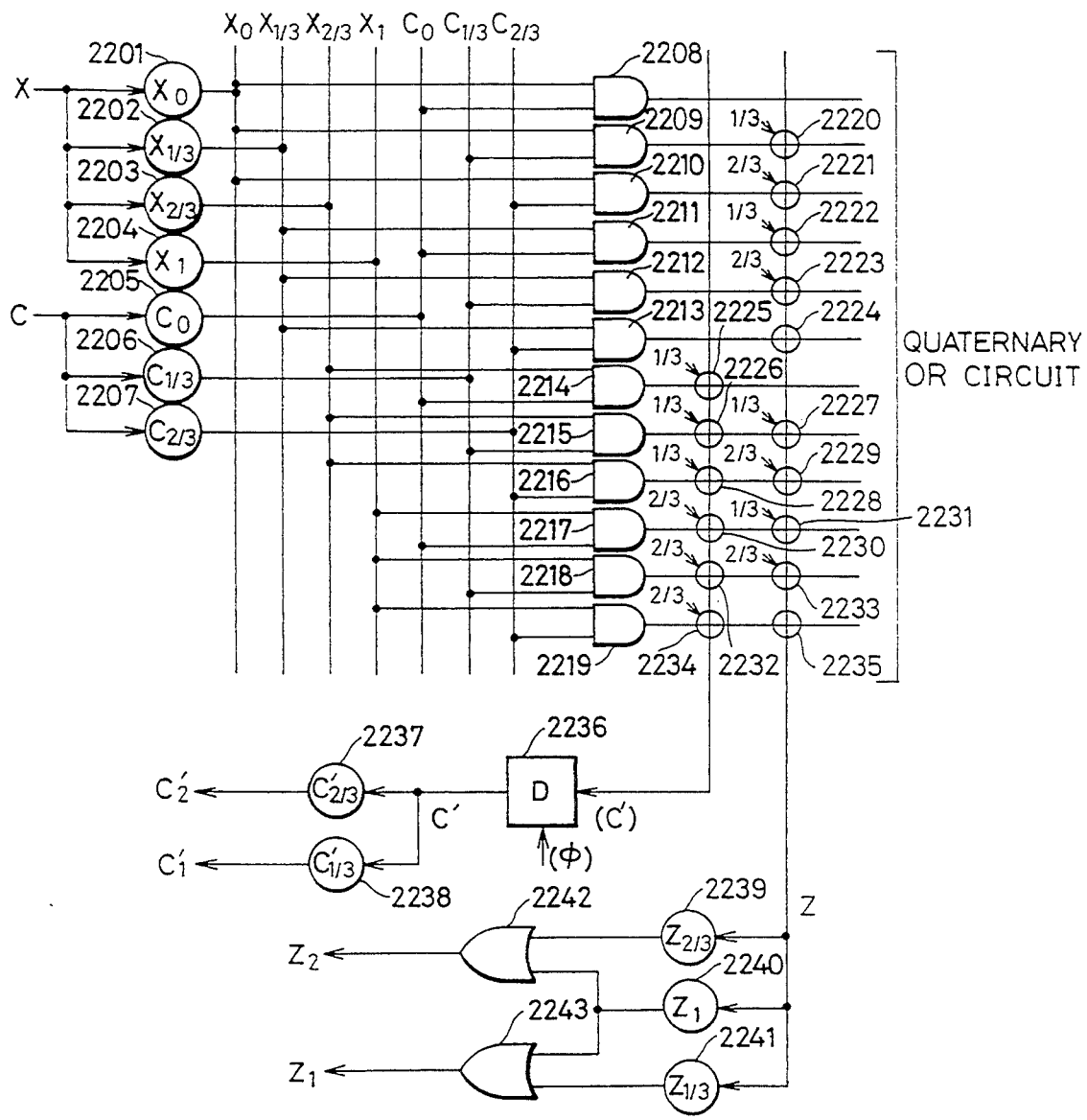
FIG. 22 is a circuit diagram showing another arrangement of the quaternary squaring circuit shown in FIG. 21.

FIG. 22 shows another embodiment of the quaternary squaring circuit arranged to have a quaternary OR circuit. This quaternary squaring circuit has the same squaring function as but a different arrangement from that shown in FIG. 21.

The quaternary squaring circuit shown in FIG. 22 is arranged to have I/O elements 2201 to 2207, AND circuit elements (AND elements) 2208 to 2219, multivalued functional elements 2220 to 2235, a one-bit delay circuit 2236, I/O elements 2237 to 2241, OR circuit elements (OR elements) 2242, 2243.

Next, each of those components will be described.

The I/O element 2201 receives a quaternary signal X and feeds a binary signal $X_0$. The I/O element 2202 receives the quaternary signal X and feeds a binary signal $X_{\frac{1}{3}}$. The I/O element 2203 receives the quaternary signal X and feeds a binary signal $X_{\frac{2}{3}}$. The I/O element 2204 receives the quaternary signal X and feeds a binary signal $X_1$.

The I/O element 2205 receives a quaternary signal C and feeds a carry signal $C_0$. The I/O element 2206 receives the quaternary signal C and feeds a carry signal $C_{\frac{1}{3}}$. The I/O element 2207 receives the quaternary signal C and feeds a carry signal $C_{\frac{2}{3}}$.

The AND element 2208 receives binary signals $X_0$, $C_0$ and feeds a logical product (AND) of these binary signals. The AND element 2209 receives binary signals $X_0$, $C_{\frac{1}{3}}$ and feeds a logical product of these binary signals.

The AND element 2210 receives binary signals $X_0$, $C_{\frac{2}{3}}$ and feeds a logical product (AND) of these binary signals. The AND element 2211 receives binary signals $X_{\frac{1}{3}}$, $C_0$ and feeds a logical product of these binary signals.

The AND element 2212 receives binary signals $X_{\frac{1}{3}}$, $C_{\frac{1}{3}}$ and feeds a logical product (AND) of these binary signals. The AND element 2213 receives binary signals $X_{\frac{1}{3}}$, $C_{\frac{2}{3}}$ and feeds a logical product of these binary signals.

The AND element 2214 receives binary signals $X_{\frac{2}{3}}$, $C_0$ and feeds a logical product (AND) of these binary signals. The AND element 2215 receives binary signals $X_{\frac{2}{3}}$, $C_{\frac{1}{3}}$ and feeds a logical product of these binary signals.

The AND element 2216 receives binary signals $X_{\frac{2}{3}}$, $C_{\frac{2}{3}}$ and feeds a logical product (AND) of these binary signals. The AND element 2217 receives binary signals $X_1$, $C_0$ and feeds a logical product of these binary signals.

The AND element 2218 receives binary signals $X_1$, $C_{\frac{1}{3}}$ and feeds a logical product (AND) of these binary signals. The AND element 2219 receives binary signals $X_1$, $C_{\frac{2}{3}}$ and feeds a logical product of these binary signals.

The multivalued functional element 2220 receives a "$\frac{1}{3}$" value signal and an output from the AND element 2209 and feeds a binary threshold value. The multivalued functional element 2221 receives a "$\frac{2}{3}$" value signal and an output from the AND element 2210 and feeds a binary threshold value.

The multivalued functional element 2222 receives a "$\frac{1}{3}$" value signal and an output from the AND element 2211 and feeds a binary threshold value. The multivalued functional element 2223 receives a "$\frac{2}{3}$" value signal and an output from the AND element 2212 and feeds a binary threshold value.

The multivalued functional element 2224 receives an output from the AND element 2213 and feeds a binary threshold value. The multivalued functional element 2225 receives a "$\frac{1}{3}$" value signal and an output from the AND element 2214 and feeds a binary threshold value.

The multivalued functional element 2226 receives a "$\frac{1}{3}$" value and an output from the AND element 2215 and feeds a binary threshold value. The multivalued functional element 2227 receives a "$\frac{1}{3}$" value signal and an output from the AND element 2215 and feeds a binary threshold value.

The multivalued functional element 2228 receives a "$\frac{1}{3}$" value signal and an output from the AND element 2216 and feeds a binary threshold value. The multivalued functional element 2229 receives a "$\frac{2}{3}$" value signal and an output from the AND element 2216 and feeds a binary threshold value.

The multivalued functional element 2230 receives a "$\frac{2}{3}$" value signal and an output from the AND element 2217 and feeds a binary threshold value. The multivalued functional element 2231 receives a "$\frac{1}{3}$" value signal and an output from the AND element 2217 and feeds a binary threshold value.

The multivalued functional element 2232 receives a "$\frac{2}{3}$" value signal and an output from the AND element 2218 and feeds a binary threshold value. The multivalued functional element 2233 receives a "$\frac{2}{3}$" value signal and an output from the AND element 2218 and feeds a binary threshold value.

The multivalued functional element 2234 receives a "$\frac{2}{3}$" value signal and an output from the AND element 2219 and feeds a binary threshold value. The multivalued functional element 2235 receives an output from the AND element 2219 and feeds a binary threshold value.

The one-bit delay circuit 2236 receives a carry signal (C′) from any one of the multivalued functional elements 2225, 2226, 2228, 2230, 2232, 2234 and feeds another carry signal C′ to the I/O elements 2237, 2238.

The I/O element 2237 receives the carry signal C′ sent from the one-bit delay circuit 2236 and feeds a carry signal C′$_2$. The I/O element 2238 also receives the carry signal C′ sent from the one-bit delay circuit 2236 and feeds a carry output C′$_1$.

The I/O element 2239 receives a multiplied value Z output from any one of the multivalued functional elements 2220, 2221, 2222, 2223, 2224, 2227, 2229, 2231, 2233, 2235 and feeds a new multiplied value $Z_{\frac{3}{2}}$ to the OR element 2242.

The I/O element 2240 receives a multiplied value Z output from any one of the multivalued functional elements 2220, 2221, 2222, 2223, 2224, 2227, 2229, 2231, 2233, 2239 and feeds a new multiplied value $Z_1$ to the OR elements 2242, 2243.

The I/O element 2241 receives a multiplied value Z output from any one of the multivalued functional elements 2220, 2221, 2222, 2223, 2224, 2227, 2229, 2231, 2233, 2235 and feeds a new multiplied value $Z_{\frac{1}{2}}$ to the OR element 2243.

The OR element 2242 feeds a multiplied output $Z_2$ corresponding to a logical sum (OR) of the output from the I/O element 2239 and the output from the I/O element 2240. The OR element 2243 feeds a multiplied output $Z_1$ corresponding to a logical sum of the output from the I/O element 2240 and the output from the I/O element 2241.

Figure 23:
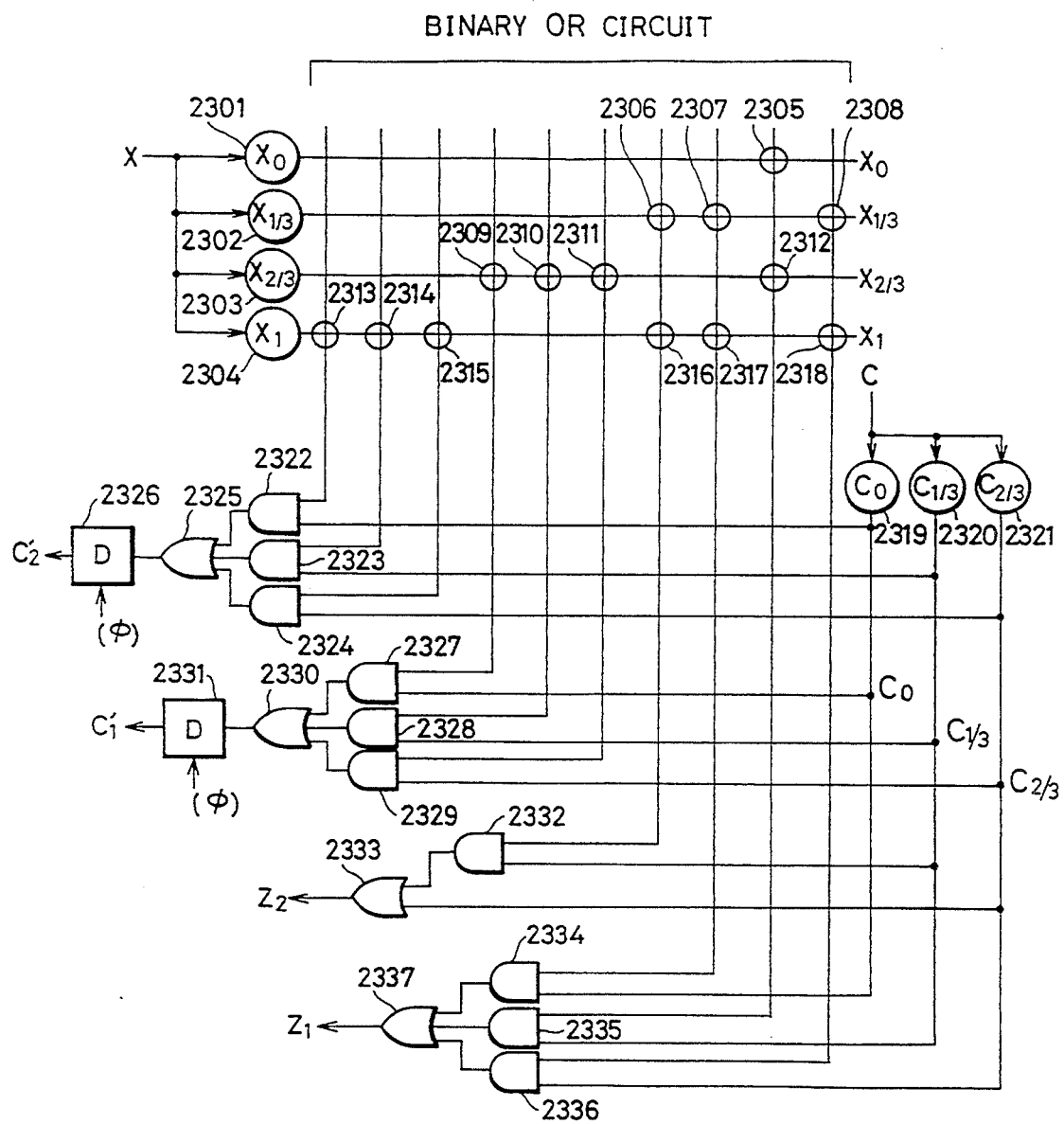
FIG. 23 is a circuit diagram showing an arrangement of a quaternary squaring circuit having a binary OR circuit arranged of binary functional elements.

FIG. 23 shows a quaternary squaring circuit having a binary OR circuit arranged of binary functional elements, which squaring circuit corresponds to the squaring circuit shown in FIG. 21 and operates in an independent manner (except the details).

The quaternary squaring circuit shown in FIG. 23 is arranged to have I/O elements 2301 to 2304, multivalued functional elements 2305 to 2318, I/O elements 2319 to 2321, AND circuit elements (AND elements) 2322 to 2324, OR circuit element (OR element) 2325, a one-bit delay circuit 2326, AND elements 2327 to 2329, OR element 2330, a one-bit delay circuit 2331, AND element 2332, OR element 2333, AND elements 2334 to 2336, and OR element 2337.

Next, each of those components will be described.

The I/O element 2301 receives a quaternary signal X and feeds a binary signal $X_0$. The I/O element 2302 receives the quaternary signal X and feeds a binary signal $X_{\frac{1}{2}}$. The I/O element 2303 receives the quaternary signal X and feeds a binary signal $X_{\frac{3}{2}}$. The I/O element 2304 receives the quaternary signal X and feeds a binary signal $X_1$.

The multivalued functional element 2305 receives the binary signal $X_0$ output from the I/O element 2301 and feeds a binary threshold value.

The multivalued functional element 2306 receives the binary signal $X_{\frac{1}{2}}$ output from the I/O element 2302 and feeds a binary threshold value. The multivalued functional element 2307 receives the binary signal $X_{\frac{1}{2}}$ output from the I/O element 2302 and feeds a binary threshold value. The multivalued functional element 2308 receives the binary signal $X_{\frac{1}{2}}$ output from the I/O element 2302 and feeds a binary threshold value.

The multivalued functional element 2309 receives the binary signal $X_{\frac{3}{2}}$ output from the I/O element 2303 and feeds a binary threshold value. The multivalued functional element 2310 receives the binary signal $X_{\frac{3}{2}}$ output from the I/O element 2303 and feeds a binary threshold value. The multivalued functional element 2311 receives the binary signal $X_{\frac{3}{2}}$ output from the I/O element 2303 and feeds a binary threshold value. The multivalued functional element 2312 receives the binary signal $X_{\frac{3}{2}}$ output from the I/O element 2303 and feeds a binary threshold value.

The multivalued functional element 2313 receives the binary signal $X_1$ output from the I/O element 2304 and feeds a binary threshold value. The multivalued functional element 2314 receives the binary signal $X_1$ output from the I/O element 2304 and feeds a binary threshold value. The multivalued functional element 2315 receives the binary signal $X_1$ output from the I/O element 2304 and feeds a binary threshold value. The multivalued functional element 2316 receives the binary signal $X_1$ output from the I/O element 2304 and feeds a binary threshold value. The multivalued functional element 2317 receives the binary signal $X_1$ output from the I/O element 2304 and feeds a binary threshold value. The multivalued functional element 2318 receives the binary signal $X_1$ output from the I/O element 2304 and feeds a binary threshold value.

The I/O element 2319 receives a quaternary signal C and feeds a carry signal $C_0$. The I/O element 2320 receives the quaternary signal C and feeds a carry signal $C_{\frac{1}{2}}$. The I/O element 2321 receives the quaternary signal C and feeds a carry signal $C_{\frac{3}{2}}$.

The AND element 2322 receives outputs from the multivalued functional element 2313 and the I/O element 2319 and feeds a logical product of the two signals to the OR element 2325. The AND element 2323 receives outputs from the multivalued functional element 2314 and the I/O element 2320 and feeds a logical product of the two signals to the OR element 2325. The AND element 2324 receives outputs from the multivalued functional element 2315 and the I/O element 2321 and feeds a logical product of the two signals to the OR element 2325.

The OR element 2325 receives three signals output from the AND elements 2322, 2323, 2324 and feeds a logical sum of the three signals to the one-bit delay circuit 2326.

The one-bit delay circuit 2326 receives a signal output from the OR element 2325 and output a carry signal $C_{2′}$.

The AND element 2327 receives outputs from the multivalued functional element 2309 and the I/O element 2319 and feeds a logical product of the two signals to the OR element 2330. The AND element 2328 receives outputs from the multivalued functional element 2310 and the I/O element 2320 and feeds a logical product of the two signals to the OR element 2330. The AND element 2329 receives outputs from the multivalued functional element 2311 and the I/O element 2321 and feeds a logical product of the two signals to the OR element 2330.

The OR element 2330 receives three signals output from the AND elements 2327, 2328, 2329 and feeds a logical sum of the three signals to the one-bit delay circuit 2331.

The one-bit delay circuit 2331 receives a signal output from the OR element 2330 and output a carry signal $C_{1′}$.

The AND element 2332 receives an output from any one of the multivalued functional elements 2306, 2316 and an output from the I/O element 2320 and feeds a logical product of the two signals to the OR element 2333.

The OR element 2333 receives a signal output from the AND element 2332 and an output from the I/O element 2321 and outputs a multiplied signal $Z_2$ as a logical sum of the two signals.

The AND element 2334 receives an output from any one of the multivalued functional elements 2307, 2317 and an output from the I/O element 2319 and feeds a logical product of the two signals to the OR element 2337. The AND element 2335 receives an output from any one of the multivalued functional elements 2305, 2312 and an output from the I/O element 2320 and feeds a logical product of the two signals to the OR element 2337. The AND element 2336 receives an output from any one of the multivalued functional elements 2308, 2318 and the I/O element 2321 and feeds a logical product of the two signals to the OR element 2337.

The OR element 2337 receives three signals output from the AND elements 2334, 2335, 2336 and outputs a multiplied signal $Z_1$ as a logical sum of the three signals.

FIG. 24 shows a logic of squares $<Z', Z>$ and FIG. 25 shows a logic of a carry $<C'>$.

Figure 26:
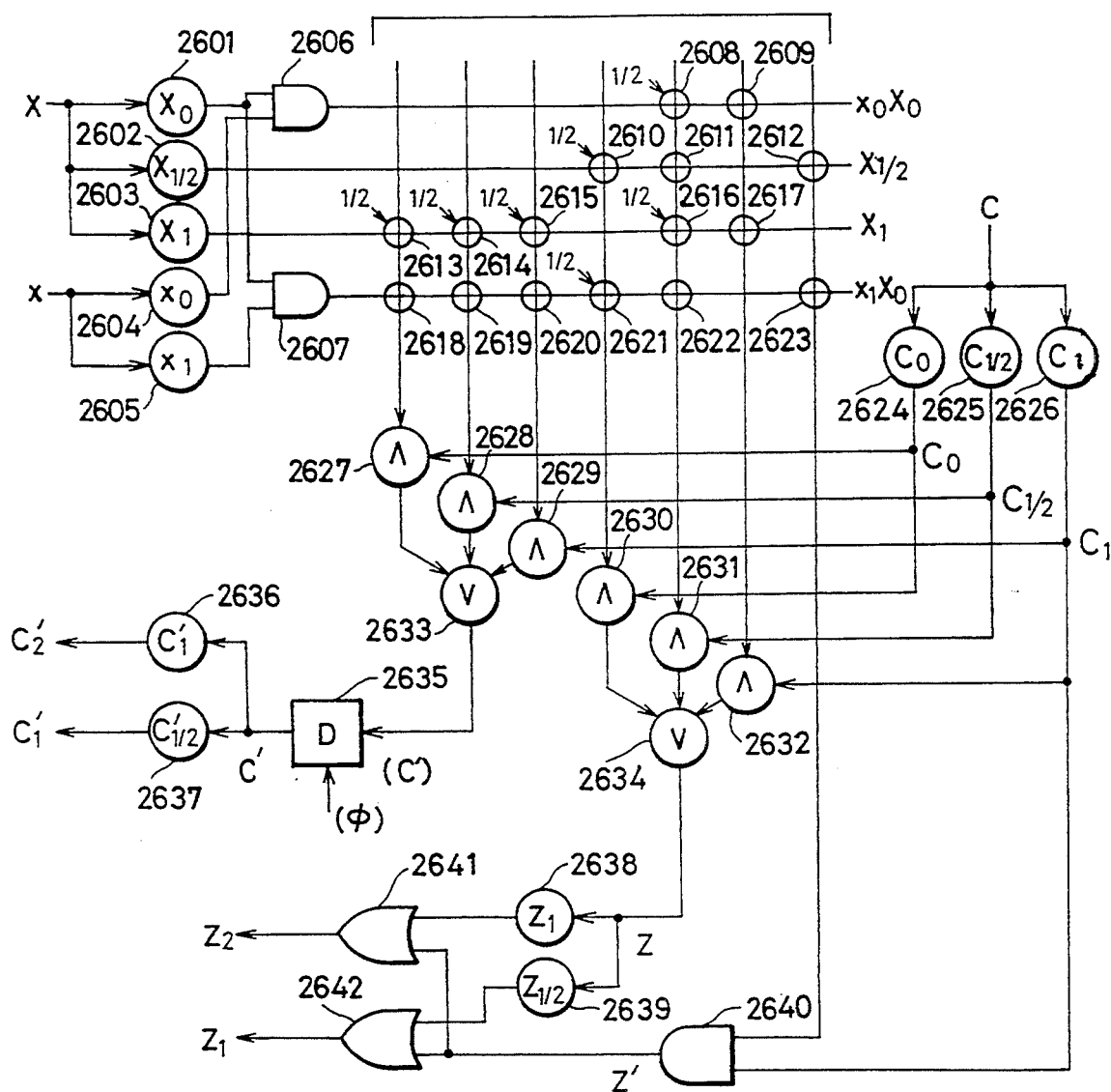
FIG. 26 is a circuit diagram showing the ternary squaring circuit arranged by synthesizing the logic shown in FIGS. 24 and 25.

FIG. 26 shows a ternary squaring circuit having the synthesized logic shown in FIGS. 24 and 25. Like the already-filed ternary multiplier, the ternary squaring circuit shown in FIG. 26 is arranged to have a ternary OR circuit composed of multivalued functional elements or quantizing elements.

The ternary multiplier shown in FIG. 26 is arranged to have I/O elements 2601 to 2605, AND circuit elements (AND elements) 2606, 2607, multivalued functional elements 2608 to 2623, I/O elements 2624 to 2626, AND elements 2627 to 2632, OR circuit elements (OR elements) 2633, 2634, a one-bit delay circuit 2635, I/O elements 2638 to 2639, an AND element 2640, OR elements 2641, 2642.

Next, each of those components will be described.

The I/O element 2601 receives a ternary signal X and feeds a binary signal $X_0$. The I/O element 2602 receives the ternary signal X and feeds a binary signal $X_{\frac{1}{2}}$. The I/O element 2603 receives the ternary signal X and feeds a binary signal $X_1$.

The I/O element 2604 receives a binary signal x and feeds a binary signal $x_0$. The I/O element 2605 receives the binary signal x and feeds the binary signal $x_1$.

The AND element 2606 receives binary signals $X_0$, $x_0$ and feeds a logical product (AND) of these binary signals.

The AND element 2607 receives binary signals $X_0$, $x_1$ and feeds a logical product of these binary signals.

The multivalued functional element 2608 receives a "$\frac{1}{2}$" value signal and an output from the AND element 2606 and feeds a ternary threshold value. The multivalued functional element 2609 receives an output from the AND element 2606 and feeds a binary threshold value.

The multivalued functional element 2610 receives a "$\frac{1}{2}$" value signal and the binary signal $X_{\frac{1}{2}}$ output from the I/O element 2602 and feeds a ternary threshold value. The multivalued functional element 2611 receives the binary signal $X_{\frac{1}{2}}$ output from the AND element 2602 and feeds a binary threshold value. The multivalued functional element 2612 receives the binary signal $X_{\frac{1}{2}}$ output from the AND element 2602 and feeds a binary threshold value.

The multivalued functional element 2613 receives a "$\frac{1}{2}$" value signal and the binary signal $X_1$ output from the AND element 2603 and feeds a ternary threshold value. The multivalued functional element 2614 receives a "$\frac{1}{2}$" value signal and the binary signal $X_1$ output from the AND element 2603 and feeds a ternary threshold value. The multivalued functional element 2615 receives a "$\frac{1}{2}$" value signal and the binary signal $X_1$ output from the I/O element 2603 and feeds a ternary threshold value. The multivalued functional element 2616 receives a "$\frac{1}{2}$" value signal and the binary signal $X_1$ output from the AND element 2603 and feeds a ternary threshold value. The multivalued functional element 2617 receives the binary signal $X_1$ output from the AND element 2603 and feeds a binary threshold value.

The multivalued functional element 2618 receives a signal output from the AND element 2607 and feeds a binary threshold value. The multivalued functional element 2619 receives the signal output from the AND element 2607 and feeds a binary threshold value. The multivalued functional element 2620 receives the signal output from the AND element 2607 and feeds a binary threshold value.

The multivalued functional element 2621 receives a "$\frac{1}{2}$" value signal and the signal output from the AND element 2607 and feeds a ternary threshold value. The multivalued functional element 2622 receives the signal output from the AND element 2607 and feeds a binary threshold value. The multivalued functional element 2623 receives the signal output from the AND element 2607 and feeds a binary threshold value.

The I/O element 2624 receives a ternary carry input C and feeds a carry signal $C_0$. The I/O element 2625 receives a ternary carry input C and feeds a carry signal $C_{\frac{1}{2}}$. The I/O element 2626 receives a ternary carry input C and feeds a carry signal $C_1$.

The AND element 2627 receives any one of the outputs from the multivalued functional elements 2613, 2618 and the carry signal $C_0$ from the I/O element 2624 and feeds a logical product (AND) of these two signals.

The AND element 2628 receives any one of the outputs from the multivalued functional elements 2614, 2619 and the carry signal $C_{\frac{1}{2}}$ from the I/O element 2625 and feeds a logical product (AND) of these two signals.

The AND element 2629 receives any one of the outputs from the multivalued functional elements 2615, 2620 and the carry signal $C_1$ from the I/O element 2626 and feeds a logical product (AND) of these two signals.

The OR element 2633 receives the outputs from the AND elements 2627, 2628 and 2629 and feeds a carry signal (C') corresponding to a logical sum (OR) of these signals. The one-bit delay circuit 2635 receives the carry signal (C') sent from the OR element 2633 and feeds another carry signal C' which is delayed by one-bit.

The I/O element 2636 receives the carry signal C' sent from the one-bit delay circuit 2635 and feeds a carry signal $C'_2$. The I/O element 2637 also receives the carry signal C' sent from the one-bit delay circuit 2635 and feeds a carry output $C'_1$.

The AND element 2630 receives any one of the outputs from the multivalued functional elements 2610, 2621 and the carry signal $C_0$ from the I/O element 2624 and feeds a logical product (AND) of these two signals.

The AND element 2631 receives any one of the outputs from the multivalued functional elements 2608, 2611, 2616, 2622 and the carry signal $C_{\frac{1}{2}}$ from the I/O element 2625 and feeds a logical product (AND) of these two signals.

The AND element 2632 receives any one of the outputs from the multivalued functional elements 2609, 2617 and the carry signal $C_1$ from the I/O element 2626 and feeds a logical product (AND) of these two signals.

The OR element 2634 receives the outputs from the AND elements 2630, 2631 and 2632 and feeds a multiplied signal Z corresponding to a logical sum (OR) of these signals.

The I/O element 2638 receives the multiplied output Z and feeds a new multiplied output $Z_1$ to the OR element 2641. The I/O element 2639 receives the multiplied output Z and feeds a new multiplied output $Z_{\frac{1}{2}}$ to the OR element 2642.

The AND element 2640 receives any one of the outputs from the multivalued functional elements 2612, 2623 and the carry signal $C_1$ sent from the I/O element 2626 and feeds a new multiplied signal Z' to the OR elements 2641, 2642 as a logical product of the two signals.

The OR element 2641 receives the outputs from the I/O element 2638 and the AND element 2640 and feeds a multiplied output $Z_2$ corresponding to a logical sum (OR) of these outputs.

The OR element 2842 receives the outputs from the I/O element 2639 and the AND element 2640 and feeds a multiplied output $Z_1$ corresponding to a logical sum (OR) of these outputs.

Like the already-filed multiplier, each squaring circuit shown in FIGS. 21, 22 or 26 may compose an operating unit having a binary-to-multivalued converting unit.

Many widely different embodiments of the present invention may be constructed without departing from the spirit and scope of the present invention. It is to be understood that the invention is not limited to the disclosed embodiments, but on the contrary, is intended to cover various modifications and equivalent arrangements included within the spirit and scope of the appended claims.

What is claimed is:

1. An apparatus for processing a multiplication of a first data and a second data, each of said first and second data being in one of binary logic and multivalued logic, comprising:

first input means having parallel inputs of binary logic and multivalued logic for receiving said first data, and for outputting a first set of bit data representing said first data;

second input means having parallel inputs of binary logic and multivalued logic for receiving said second data, and for outputting a second set of bit data representing said second data;

multiplying means connected to said first input means and said second input means for multiplying said first set of bit data by said second set of bit data; and output means, connected to said multiplying means, for converting output of said multiplying means into data in binary logic and multivalued logic, in parallel, and for outputting converted data in binary logic and multivalued logic, in parallel.

2. An apparatus according to claim 1, wherein said multiplying means includes a plurality of AND circuits and a plurality of multivalued functional elements.

3. An apparatus according to claim 2, wherein each of said multivalued functional elements receives data and outputs a threshold signal representing a threshold value of multivalued logic.

4. An apparatus according to claim 1, wherein said multivalued logic is ternary logic.

5. An apparatus according to claim 4, wherein each of said first set of bit data and said second set of bit data includes five binary data.

6. An apparatus according to claim 1, wherein said multivalued logic is quarternary logic.

7. An apparatus according to claim 6, wherein each of said first set of bit data and said second set of bit data includes six binary data.

8. An apparatus for processing a multiplication of a first data and a second data, each of said first and second data being in one of binary logic and multivalued logic, comprising:

multivalued converting means for receiving said first data if said first data is in binary logic, and for converting said first data into data in multivalued logic, said multivalued converting means for receiving said second data if said second data is in binary logic, and for converting said second data into data in multivalued logic;

multivalued input means for receiving said first data if said first data is in multivalued logic, and for receiving said second data if said second data is in multivalued logic;

multiplying means, connected to said multivalued converting means and said multivalued input means, for multiplying said first data in multivalued logic output by one of said multivalued converting means and said multivalued input means by said second data in multivalued logic output by one of said multivalued converting means and said multivalued input means;

multivalued output means connected to said multiplying means for outputting a multiplication result of said multiplying performed by said multiplying means; and binary converting means connected to said multiplying means in parallel with said multivalued output means for converting said multiplication result into data in binary logic and for outputting said multiplication result in binary logic.

9. An apparatus according to claim 8, wherein said multiplying means includes a plurality of AND circuits and a plurality of multivalued functional elements.

10. An apparatus according to claim 9, wherein each of said multivalued functional elements receives data and outputs a threshold signal representing a threshold value of multivalued logic.

11. An apparatus according to claim 8, wherein said multivalued logic is ternary logic.

12. An apparatus according to claim 8, wherein said multivalued logic is quarternary logic.

* * * * *